US010241289B2

(12) United States Patent
Claessens et al.

(10) Patent No.: US 10,241,289 B2
(45) Date of Patent: *Mar. 26, 2019

(54) PASS-THROUGH ASSEMBLY HAVING AN ANCHOR MEMBER AND A COVER

(71) Applicant: CommScope Connectivity Belgium BVBA, Kessel-Lo (BE)

(72) Inventors: Bart Mattie Claessens, Hasselt (BE); Philippe Coenegracht, Hasselt (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,438

(22) Filed: Nov. 22, 2017

(65) Prior Publication Data

US 2018/0196215 A1     Jul. 12, 2018

Related U.S. Application Data

(63) Continuation of application No. 14/913,899, filed as application No. PCT/EP2014/068008 on Aug. 25, 2014, now Pat. No. 9,829,668.

(Continued)

(51) Int. Cl.
*G02B 6/44*         (2006.01)
*G02B 6/38*         (2006.01)

(52) U.S. Cl.
CPC ......... *G02B 6/4477* (2013.01); *G02B 6/3897* (2013.01); *G02B 6/4444* (2013.01); *G02B 6/4476* (2013.01)

(58) Field of Classification Search
CPC .. G02B 6/4477; G02B 6/3897; G02B 6/4444; G02B 6/4476

(Continued)

(56) References Cited

U.S. PATENT DOCUMENTS 6,263,145 B1    7/2001    Daoud
7,747,126 B2 *   6/2010    Dunphy ................ G01D 5/268
                                                              385/12

(Continued)

FOREIGN PATENT DOCUMENTS

WO     2009/049037 A2    4/2009
WO     2010/008718 A2    1/2010

(Continued)

OTHER PUBLICATIONS

International Search Report and Written Opinion for International Application No. PCT/EP2014/068008 dated Feb. 6, 2015 (23 pages).

*Primary Examiner* — Thomas A Hollweg
*Assistant Examiner* — Guy Anderson
(74) *Attorney, Agent, or Firm* — Merchant & Gould P.C.

(57) ABSTRACT

Anchoring an input cable (190) at an input port (123, 223) of an enclosure (110) includes inserting the input cable (190) through an anchor member (151, 251) so that a cable jacket (191) terminates within the anchor member (151, 251) and at least one optical fiber (195) extends outwardly from the anchor member (151, 251). The anchor member (151, 251) is secured to the cable jacket (191) using the sheath (175). A cover (162, 260) is mounted to the anchor member (151, 251) to form a pass-through assembly (150, 250) defining an enclosed region. Material is injected into the enclosed region to fix strength members (197) and/or optical fibers (195) of the input cable (190) to the pass-through assembly (150, 250). The ruggedized pass-through assembly (150, 250) is disposed at a base (120, 220) of the enclosure (110).

20 Claims, 22 Drawing Sheets

Related U.S. Application Data

(60) Provisional application No. 61/869,363, filed on Aug. 23, 2013.

(58) Field of Classification Search
USPC .................................... 385/113, 135–137
See application file for complete search history.

(56) References Cited

U.S. PATENT DOCUMENTS

| | | | | |
|---|---|---|---|---|
| 8,068,714 | B2* | 11/2011 | Dunphy | G01D 5/268 385/101 |
| 8,351,755 | B2* | 1/2013 | Dunphy | G01D 5/268 385/12 |
| 2005/0213921 | A1* | 9/2005 | Mertesdorf | G02B 6/3897 385/135 |
| 2006/0045440 | A1 | 3/2006 | Tinucci | |
| 2008/0232743 | A1 | 9/2008 | Gronvall et al. | |
| 2009/0148101 | A1 | 6/2009 | Lu et al. | |
| 2009/0238531 | A1* | 9/2009 | Holmberg | G02B 6/445 385/135 |
| 2011/0300741 | A1* | 12/2011 | Spicer | H01R 13/5808 439/460 |
| 2012/0015555 | A1* | 1/2012 | Deimel | H05K 9/0018 439/607.41 |
| 2012/0106914 | A1* | 5/2012 | Solheid | G02B 6/4248 385/136 |
| 2012/0125555 | A1 | 5/2012 | Greimel et al. | |
| 2012/0237173 | A1 | 9/2012 | Alston et al. | |
| 2013/0156377 | A1* | 6/2013 | DeMeritt | G02B 6/3885 385/59 |
| 2014/0270674 | A1* | 9/2014 | Cairns | G02B 6/4441 385/135 |
| 2015/0260936 | A1* | 9/2015 | Newbury | G02B 6/4471 385/135 |

FOREIGN PATENT DOCUMENTS

| | | |
|---|---|---|
| WO | 2010015846 A1 | 2/2010 |
| WO | 2010/025346 A1 | 3/2010 |

\* cited by examiner

PASS-THROUGH ASSEMBLY HAVING AN ANCHOR MEMBER AND A COVER

CROSS-REFERENCE TO RELATED APPLICATIONS

This application is a Continuation of U.S. patent application Ser. No. 14/913,899, filed on Feb. 23, 2016, now U.S. Pat. No. 9,829,668, which is a National Stage of PCT/EP2014/068008 filed on Aug. 25, 2014, which claims the benefit of U.S. Provisional Application No. 61/869,363 filed on Aug. 23, 2013 and which applications are incorporated herein by reference. To the extent appropriate, a claim of priority is made to each of the above disclosed applications.

BACKGROUND

Expansion of fiber optic based telecommunication service is being extended to greater diversity of businesses and homes. Many of these extensions of service within neighborhoods, industrial parks and business developments utilize optical fiber distribution cables laid within buried conduit. Such optical fiber distribution cables might extend from a larger fiber distribution terminal or pedestal to a smaller fiber access terminal directly adjacent the business or home to which service may be provided. From the fiber access terminal to the home or business, a fiber drop cable may connect to the home or business.

Currently, when fiber optic cables are extended from a fiber distribution terminal to a fiber access terminal, a variety of techniques are available for sealing and anchoring the cables relative to the fiber access terminal. It is desirable to provide sealing and anchoring configurations that are secure, reliable, and cost effective.

SUMMARY

In accordance with some aspects, an example method of anchoring an input cable at an input port of an enclosure includes sliding a shape-recoverable (e.g., heat shrink) sheath over a cable; sliding an anchor member over a cable so that a jacket of the cable terminates within the anchor member and optical fibers of the cable extend outwardly from the anchor member; sealing the anchor member relative to the cable jacket using the shape-recoverable sheath; mounting a cover to the anchor member to form a pass-through assembly defining an enclosed region within which strength members of the cable are disposed; and injecting adhesive material into the enclosed region to fix the strength members to the pass-through assembly.

In certain implementations, the sheath is shrunk over the sleeve and the jacket using a heat gun or other heat source. In certain implementations, resin, epoxy, or some other adhesive is injected into the enclosed region.

In some implementations, a threaded section of the pass-through assembly is inserted into an enclosure through a cable port so that a retention flange abuts an exterior of the enclosure at the cable port. A nut is tightened on the threaded section to secure the pass-through assembly to the enclosure. In certain examples, a seal such as a gasket (e.g., an elastomeric O-ring) can be provided between the retention flange and the exterior of the enclosure to inhibit ingress of water, dirt, or other contaminants through the cable port. In other implementations, the anchor member is monolithically formed with a base of the enclosure.

In accordance with other aspects, an example pass-through assembly includes an anchor member and a cover. The anchor member includes a sleeve at a first end and a fanout section at a second end. The anchor member defines a longitudinal passage extending therethrough. The cover is configured to mount to the fanout section of the anchor member to cover an open channel of the fanout section to form a potting region. The cover defines an injection port through which potting material can enter the potting region. The cover also is configured to separate optical fibers of the optical fiber cable as the optical fibers extend outwardly from the potting region.

In accordance with other aspects, an enclosure includes a housing defining an interior accessible through an open bottom; a base configured to mount to the housing at the open bottom to form an enclosure; a management frame configured to couple to a top of the base; and a cover configured to mount to the enclosure. The base has a platform that defines multiple output ports. The management frame extends into the interior of the housing when the base is mounted to the housing. The cover is movable relative to the enclosure to a first position allowing access to the output ports from the exterior of the enclosure and a second position where the cover inhibits access to the output ports from an exterior of the enclosure.

In some examples, the platform of the base defines an input port. In other examples, a sleeve of an anchor member extends outwardly from the platform to define the input port. In one example, the management frame is detachable from the base to facilitate accessing the top side of the base platform and output ports.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
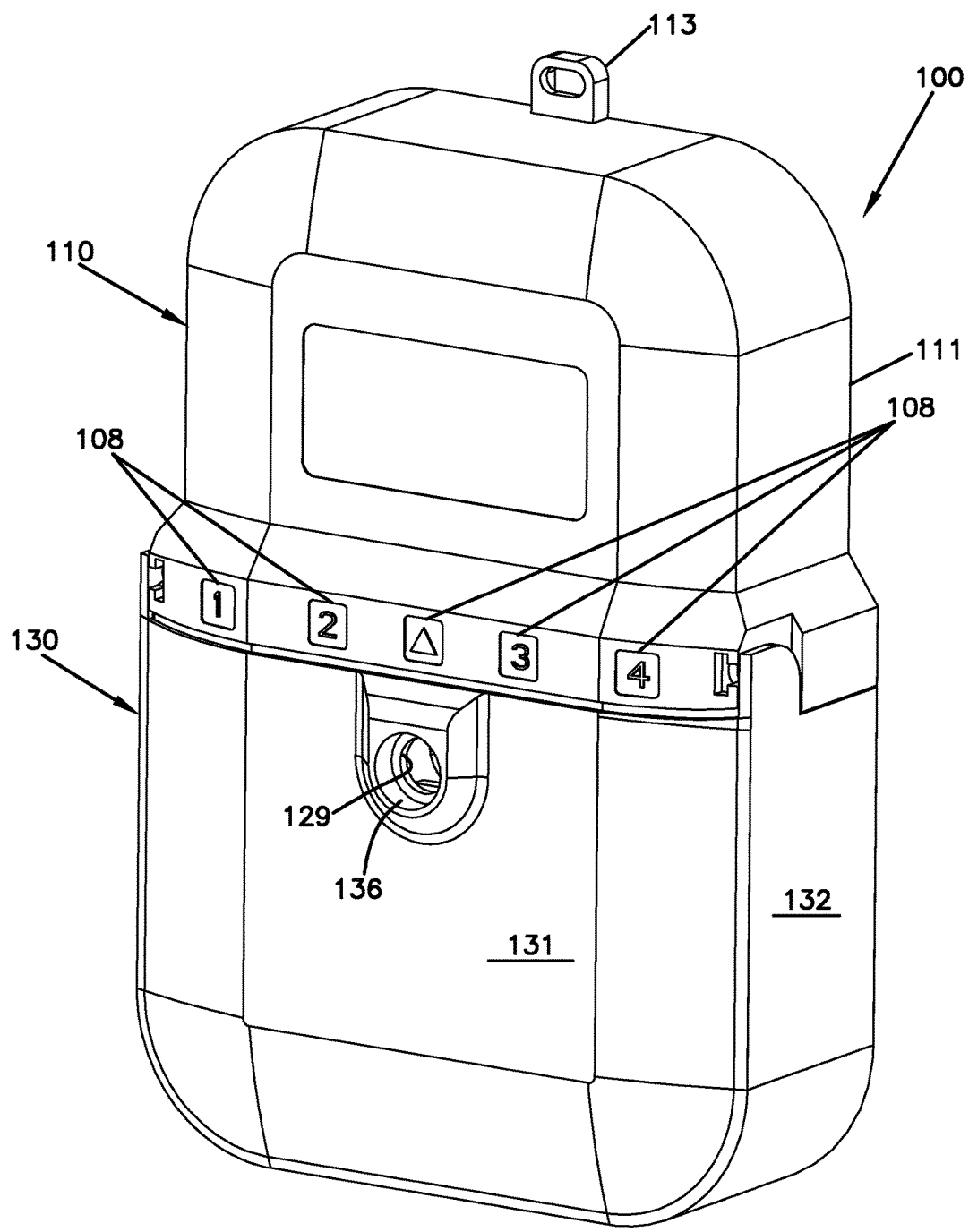
FIG. 1 is a front perspective view of an example fiber distribution terminal configured in accordance with the principles of the present disclosure.

FIG. 1 is a front perspective view of an example fiber distribution terminal 100 configured in accordance with the principles of the present disclosure. The terminal 100 is configured to receive at least one input fiber carrying optical signals and at least two output fibers that receive the optical signals. The terminal 100 encloses and protects the optical coupling between the input and output fibers.

Figure 2:
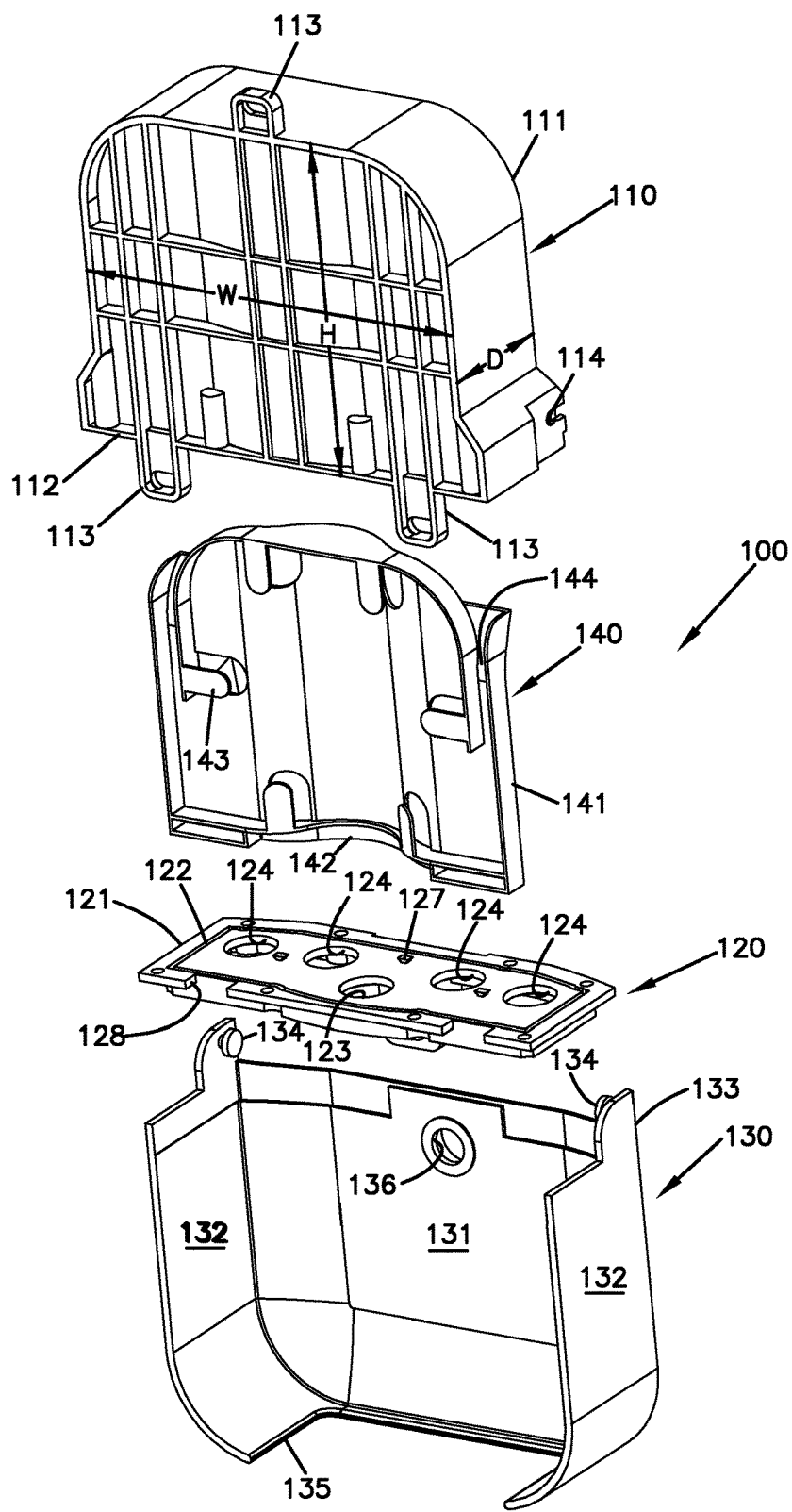
FIG. 2 is an exploded view of the fiber distribution terminal of FIG. 1.

As shown in FIG. 2, the terminal 100 includes a housing 111 having a height H, a width W, and a primary depth D. In some implementations, the housing 111 has a low profile in that the primary depth D is less than the height H and the primary depth D is less than the width W. In certain implementations, the primary depth D is significantly less than the width W and significantly less than the height H. For example, in certain implementations, the primary depth D is less than 50% of the width W and less than 50% of the height H. In certain implementations, the primary depth D is less than 35% of the width W and less than 40% of the height H.

The housing 111 defines a closed end opposite an open end 112 that are defined by the width W and depth D of the housing 111. The housing 111 defines a hollow interior accessible through the open end 112. In certain implementations the housing 111 can expand outwardly towards the open end 112. Accordingly, the housing 111 can have a greater width and depth at the open end 112 than at the closed end. The housing 111 also includes one or more mounting brackets 113 for securing the enclosure 110 to a wall, pole, or other surface.

Figure 5:
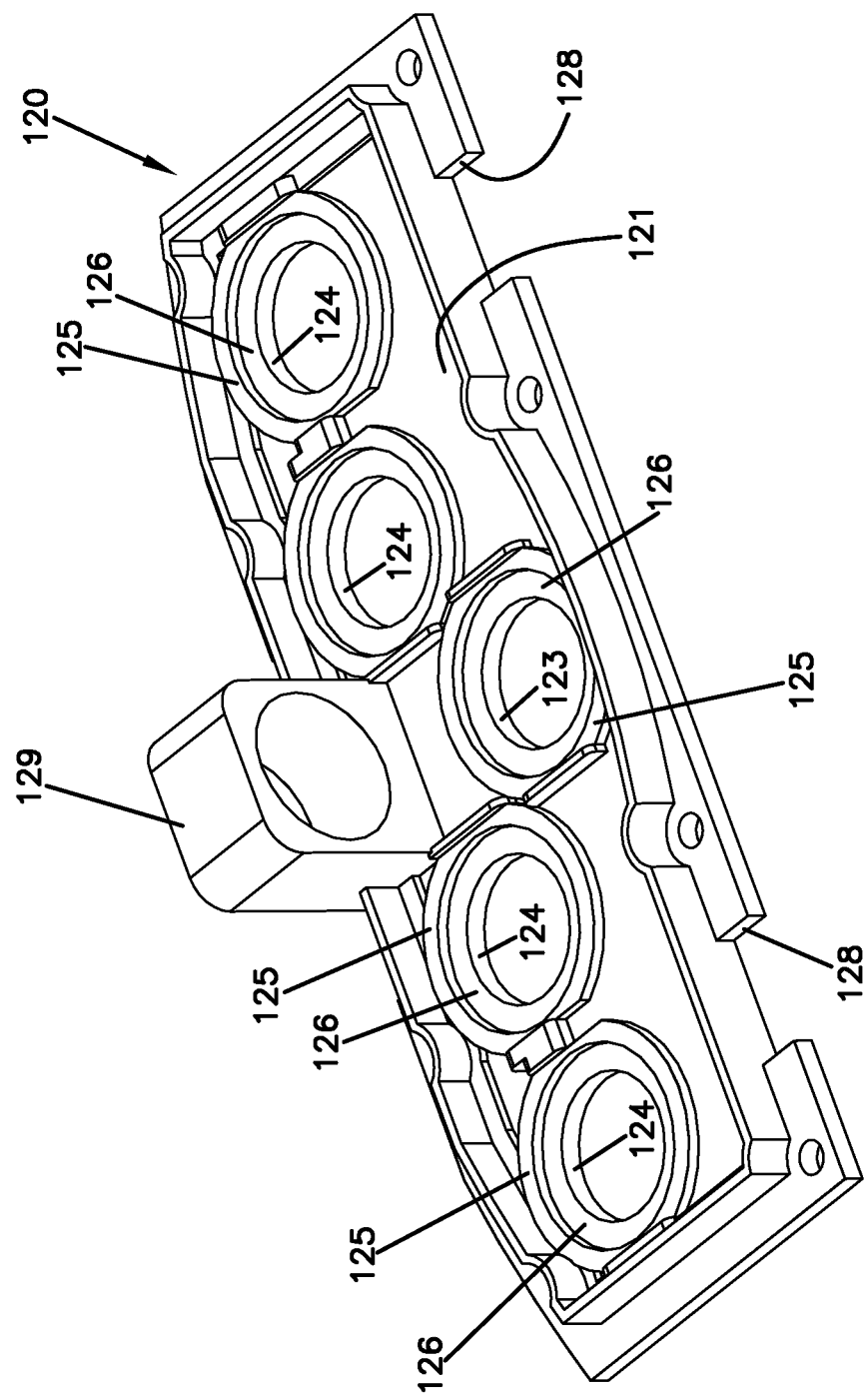
FIG. 5 is a bottom perspective view of a base of the fiber distribution terminal of FIG. 1.

A base 120 mounts to the housing 111 at the open end 112 of the housing 111 to close the hollow interior. In the example shown, the base 120 includes a body 121 having a first side defining a platform and a second side. The platform faces the hollow interior of the housing 111 when the base 120 is mounted to the housing 111. The platform defines a channel 122 in which a gasket (e.g., rubber, foam, gel, etc.) seats to seal the body 121 to the housing 111. In certain implementations, the body 121 defines cutouts 128 that accommodate bracket flanges 113 extend outwardly from the housing 111 (see FIG. 5).

The base platform defines input and output cable ports 123, 124 at which the optical fibers enter and leave the enclosure 110. For example, the base 120 defines at least one input port 123 and at least two output ports 124 extending through the body 121. The housing 111 can include labels 108 that identify each output port 124 (FIG. 1). An input cable 190 (e.g., a feed cable) can be routed to the input port 123 of the base 120 and multiple output cables 185 (e.g., drop cables) can be routed to the output ports 124 of the base 120. Each port 123, 124 is surrounded at the bottom of the base 120 by a short wall 125 (see FIG. 5) that is spaced radially outwardly from the port 123, 124 to provide a recessed surface 126 around the port 123, 124 (see FIG. 5). As will be described in more detail herein, a gasket (e.g., an O-ring) can be provided at the recessed surface 126 to seal the cables 190, 185 to the base 120.

Referring back to FIGS. 1 and 2, a cover 130 can be mounted to the enclosure 110 to inhibit access to cable connections made at the base 120. The cover 130 can be connected to the housing 110 so that the cover 130 moves relative to the housing 110 to allow access to the cable connection locations. In some implementations, the cover 130 is configured to move (e.g., pivot) between a closed position inhibiting access to the base 120 and an open position allowing access to the base 120. In other implementations, the cover 130 is removable from the enclosure 110 to provide access to the base 120. In certain implementations, the cover 130 can be locked in the closed position relative to the enclosure 110 (e.g., by a keyed lock).

In the example shown, the cover 130 includes two side walls 132 extending rearwardly from a front plate 131. The cover 130 defines an open bottom 135 through which the cables 190, 185 pass. The cover 130 also defines an open back and an open top. Pivot pins 134 are disposed on flanges 133 extending upwardly from the cover 130. The pivot pins 134 mate with slots 114 defined by the enclosure housing 111 to enable pivoting the cover 130 relative to the housing 111. The front plate 131 defines an opening 136 that aligns with an opening defined in a retention flange 129 of the base 120 when the cover 130 is in the closed position. The cover 130 can be locked in the closed position by inserting a fastener, a lock, or other structure through these openings.

A management frame 140 is coupled to the base 120 and extends into the hollow interior of the enclosure 110. In the example shown, retaining structures 127 are disposed on the base body 121. The management frame 140 can be releasably attached to the retaining structures 127. The optical fibers disposed within the enclosure 110 are routed over and organized at the management frame 140. In certain implementations, one or more telecommunications components (e.g., optical splitters, optical splices, storage spools, etc.) can be disposed on the frame 130.

Figure 3:
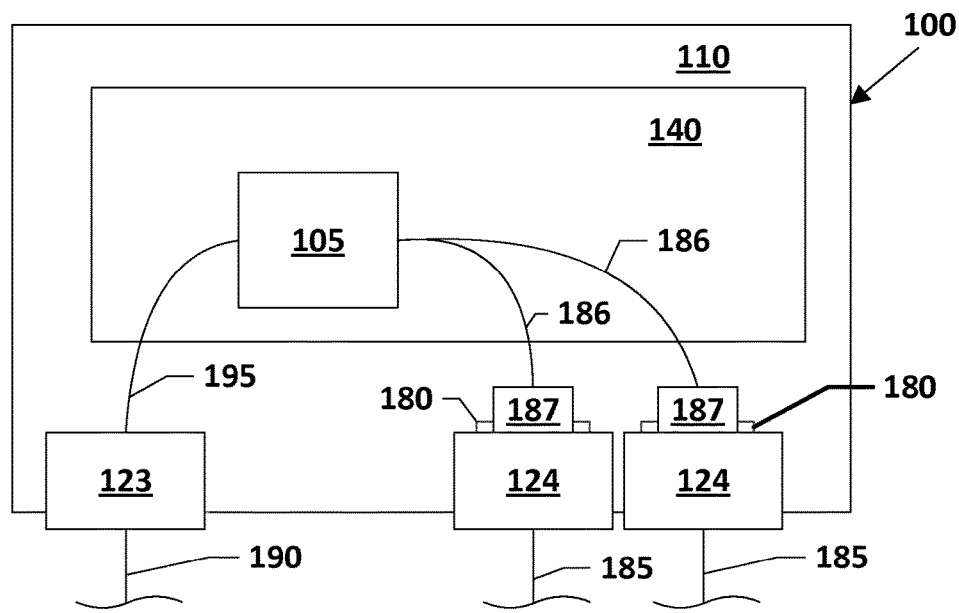
FIG. 3 is a schematic diagram illustrating one example configuration for the terminal in which a single input fiber couples to multiple output fibers.

FIG. 3 is a schematic diagram illustrating one example configuration for the terminal 100. In this configuration, a single input fiber 195 is optically coupled to multiple output fibers 185. In some implementations, one or more optical splitters 105 are disposed within the enclosure 110. For example, the splitters 105 can be mounted to the management panel 140. Each splitter 105 receives an input fiber 195 and splits optical signals from the input fiber 195 to splitter pigtails 186 having connectorized ends 187. Splitter pigtails 186 extend outwardly from the splitter 105 to carry the optical signals split from the input fiber 195. The splitter pigtails 186 are terminated at optical connectors 187 that are routed to optical adapters 180 disposed at the output ports 124. Connectorized output cables 185 can be plugged into the optical adapters 180 from an exterior of the enclosure 110.

In some implementations, the input cable 190 is anchored at the input port 123; and the input fiber 195 is routed within the enclosure 110 from the input port 123 to the splitter 105. In other implementations, the input cable 190 is terminated at a connector that is plugged into an optical adapter disposed at the input port 123. A splitter input pigtail is routed within the enclosure 110 between the optical adapter and the splitter 105. In other implementations, the input fiber 195 can be spliced to a splitter input fiber.

Figure 4:
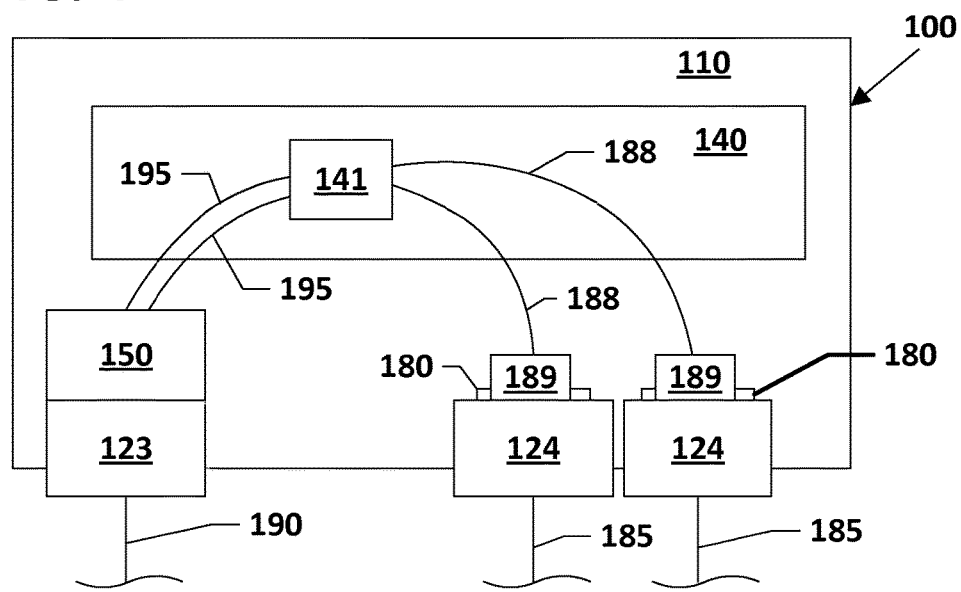
FIG. 4 is a schematic diagram illustrating another example configuration for the terminal in which multiple input fibers couple to multiple output fibers.

FIG. 4 is a schematic diagram illustrating another example configuration for the terminal 100. In this configuration, multiple fibers of an input cable 190 are optically coupled to multiple fibers of output cables 185. The input cable 190 is routed to the cable port 123 defined in the base 120. A pass-through assembly 150 is arranged at the input cable 190 to anchor the input cable 190 to the base 120 as described in more detail herein. Input optical fibers 195 extend away from the pass-through assembly 150 within the enclosure 110 and are spliced to pigtails 188 having connectorized ends 189 that are plugged into the optical adapters 180 at the output ports 124 of the base 120. The splicing can take place at a splice tray or splice module 141 supported on the manager 140.

In other implementations, the input cable 190 can include multiple input fibers 195 terminated by a multi-fiber connector. The multi-fiber connector of the input cable 190 can be plugged into an external port of a multi-fiber adapter disposed at the input port 123. In some such implementations, an internally disposed cable can include multiple optical fibers terminated at a first end by a multi-fiber connector (e.g., an MPO connector) and terminated at a second end by individual single optical connectors (e.g., SC connectors, LC connectors, LX.5 connectors, etc.). The multi-fiber connector at the first end of the internally disposed cable can be plugged into an internal port of the multi-fiber adapter and the connectorized second ends can be plugged into internal ports of the optical adapters 180 disposed at the output ports 124 of the base 120.

In accordance with some aspects, the cables 190, 185 are coupled to the base 120 using ruggedized adapters 180 and/or ruggedized pass-through assemblies 150. The term "ruggedized" means that the component (e.g., adapter, pass-through assembly, etc.) is sealed against the surrounding environment to protect the optical fibers disposed within the component. Example ruggedized adapters 180 include DLX adapters that are disclosed in more detail in U.S. Pat. No. 7,744,288, the disclosure of which is hereby incorporated by reference herein.

Figure 16:
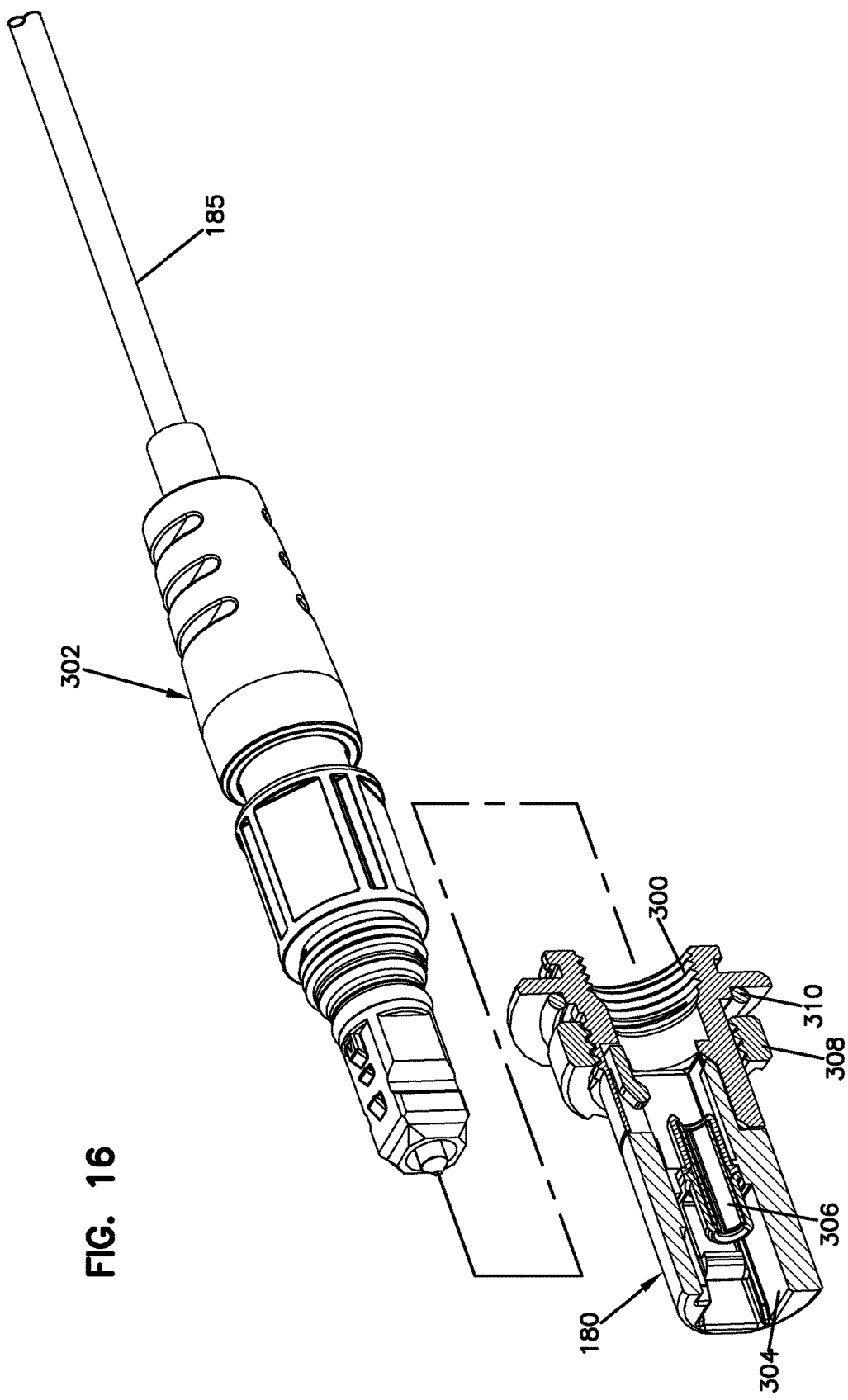
FIG. 16 shows a ruggedized connector and a ruggedized adapter that are examples of adapter/connector combinations that can be installed in the base of the enclosures in accordance with the principles of the present disclosure.
Figure 17:
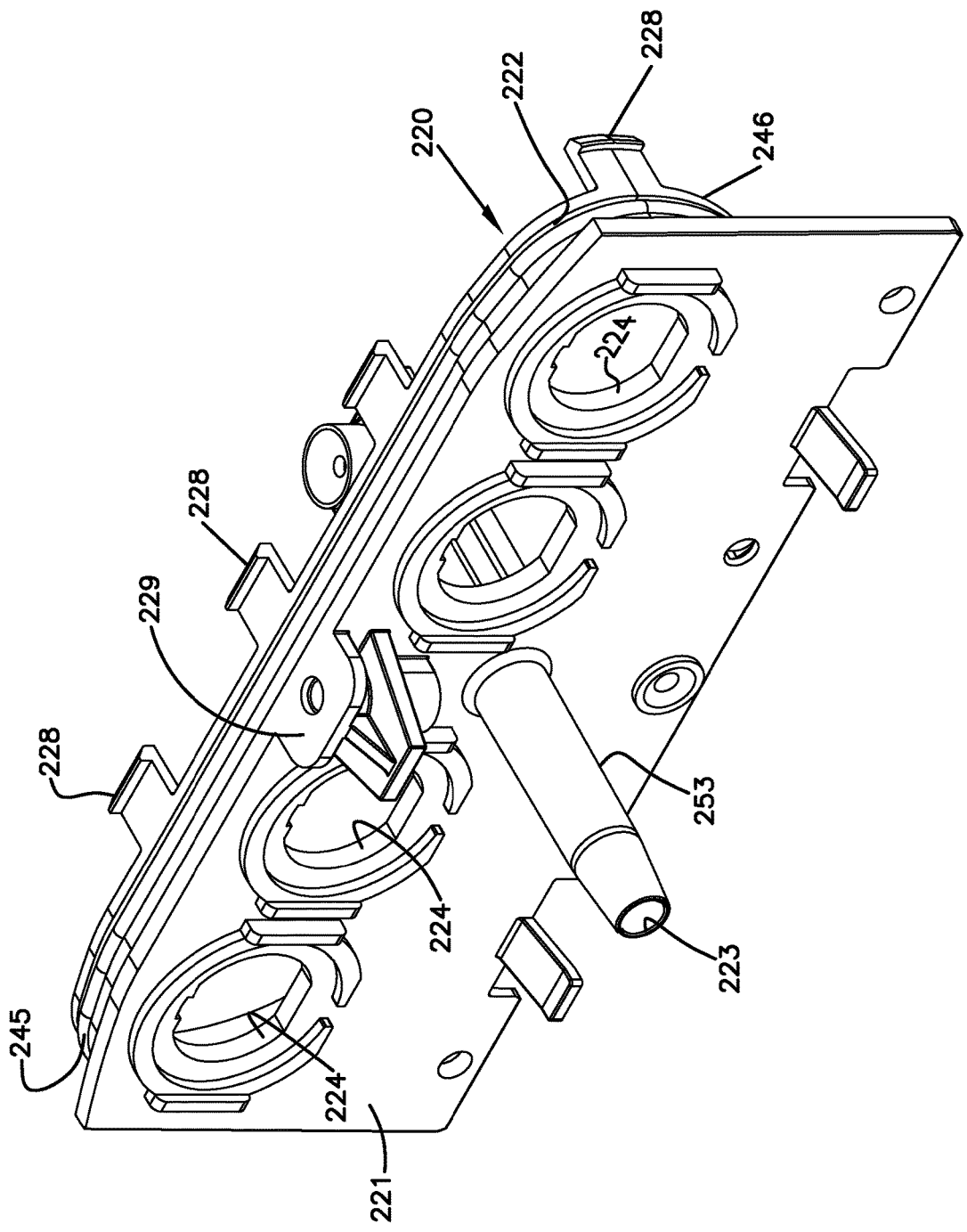
FIG. 17 is a bottom perspective view of another example base having a monolithically formed anchor member.
Figure 18:
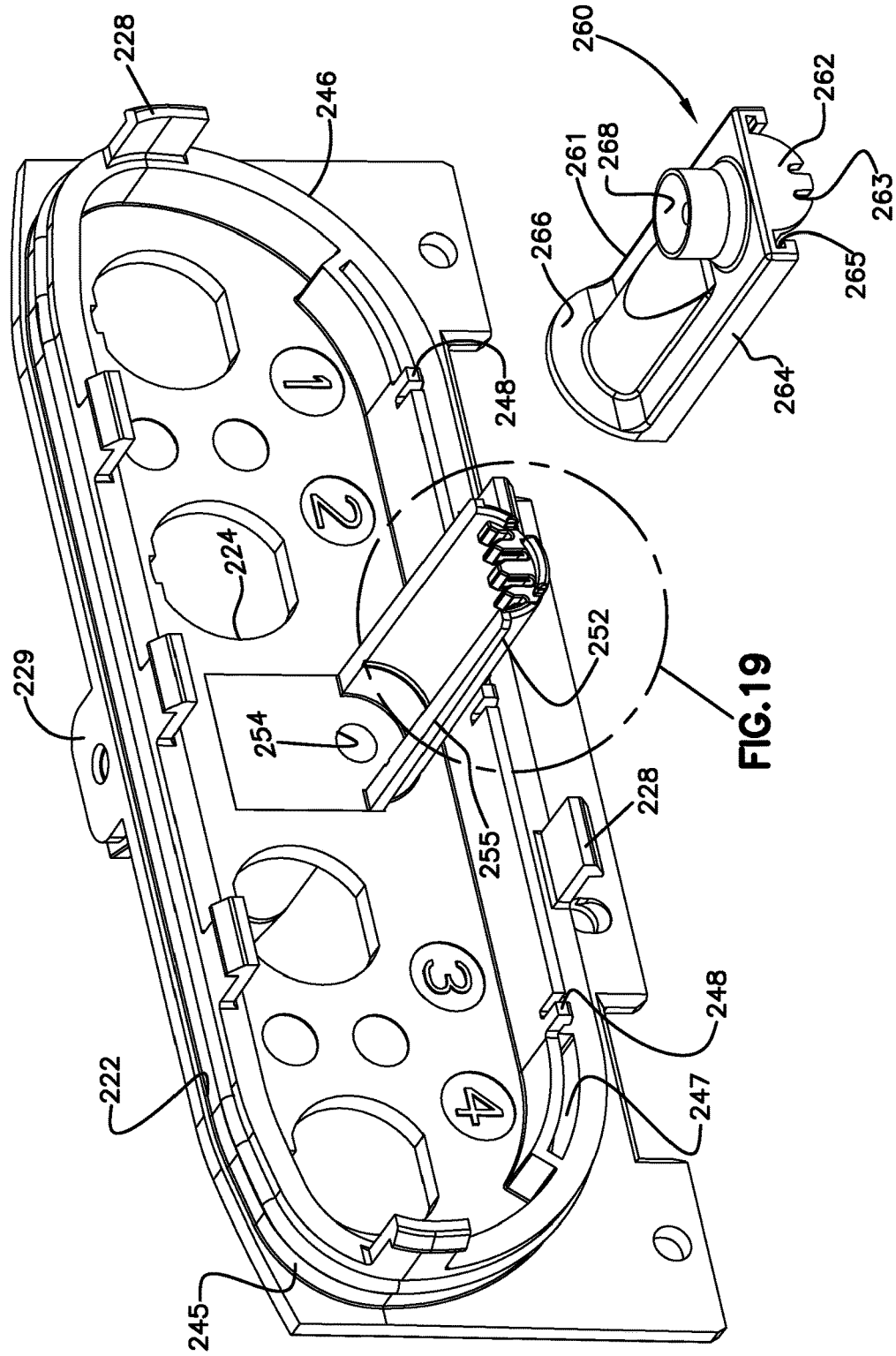
FIG. 18 is a top perspective view of the base of FIG. 17 with another example cover shown exploded off the fanout section of the anchor member of FIG. 17.
Figure 19:
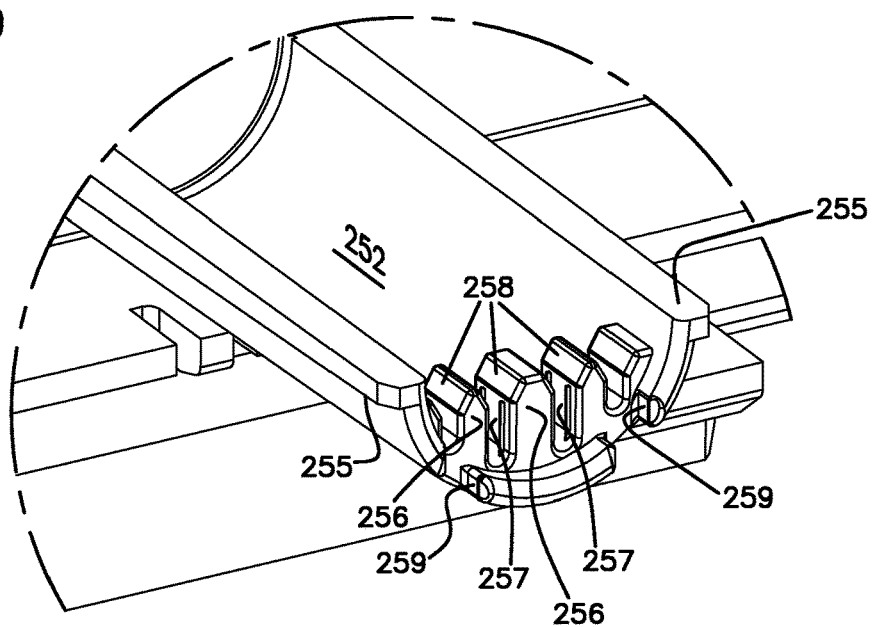
FIG. 19 is an enlarged view of a portion of FIG. 18.
Figure 20:
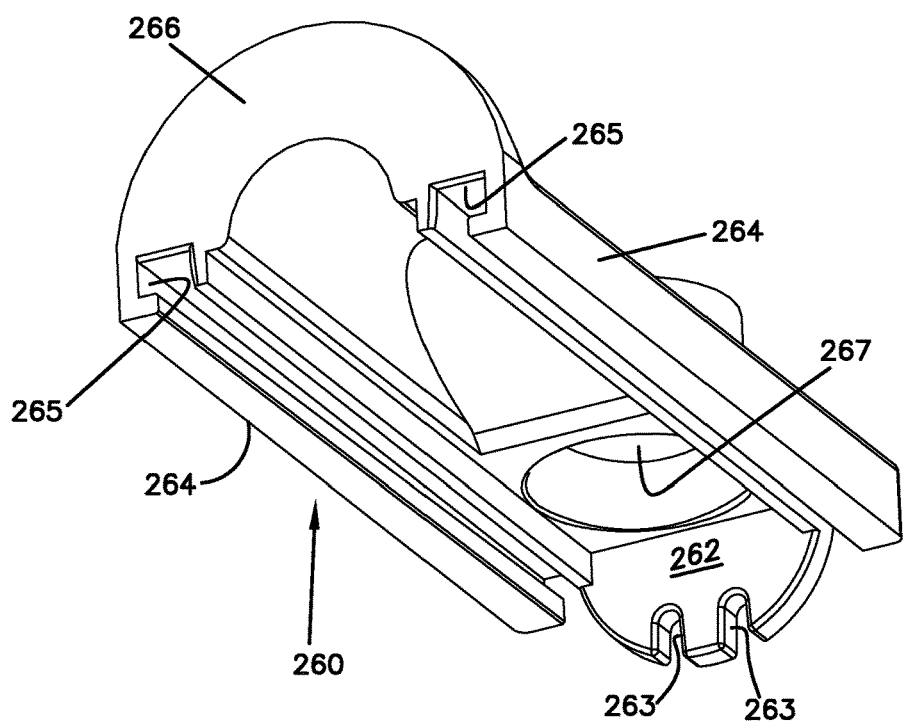
FIG. 20 is a bottom perspective view of the example cover of FIG. 18.
Figure 21:
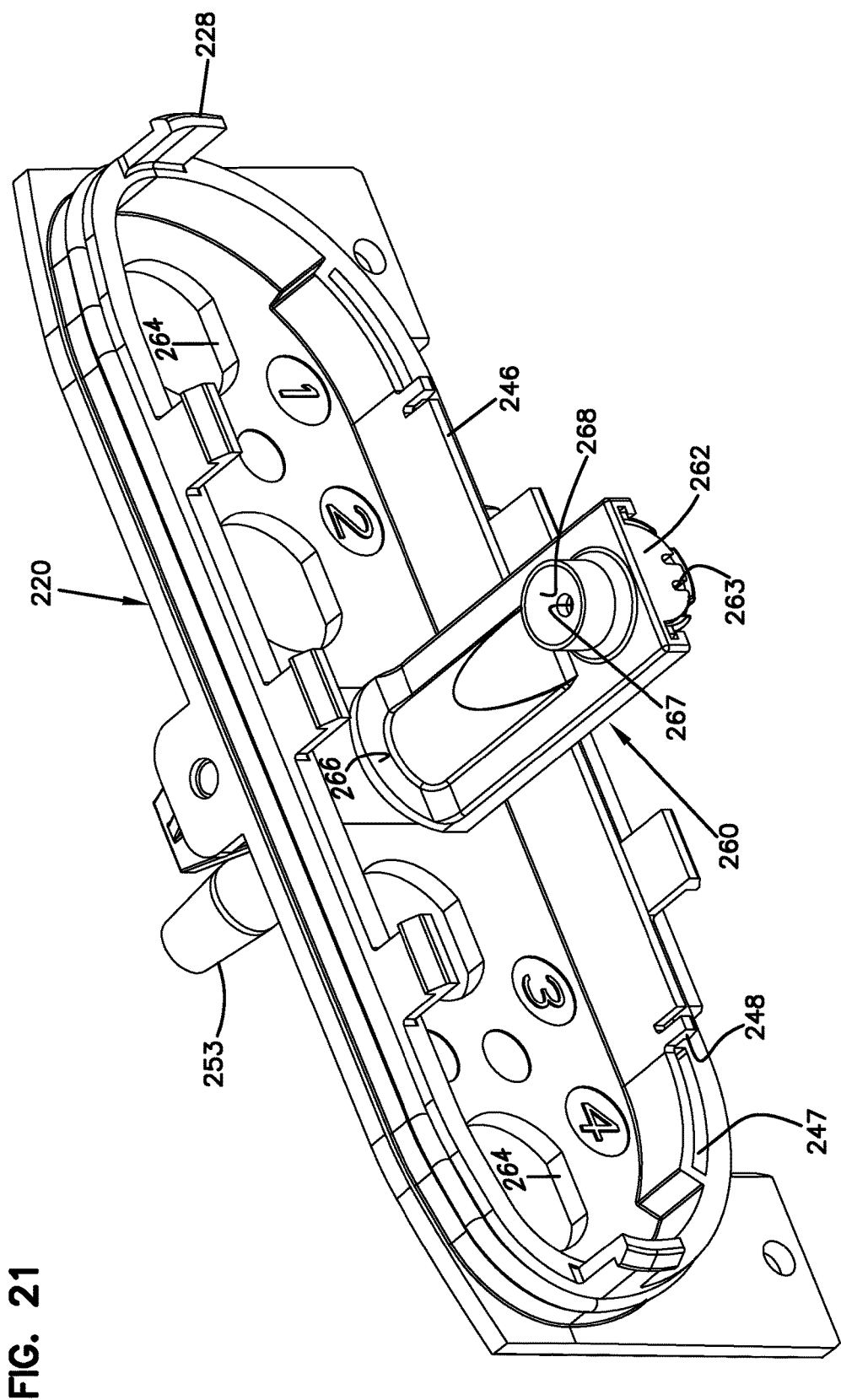
FIG. 21 is a top perspective view of the base of FIG. 18 with the cover mounted to the anchor member.

As shown at FIG. 16, the ruggedized adapters 180 can include both outer ports 300 that receive ruggedized connectors 302 terminating cables 185 and inner ports 304 that receive the connectorized ends 187, 189 of the pigtails 186, 188. The ruggedized adapters 180 can include alignment sleeves 306 for aligning the ferrules of the connectors desired to be optically coupled together. Each adapter 180 can include a nut 308 that threads on the main body of the adapter 180 to secure the adapter 180 at a given port 124. Each adapter 180 includes a seal 310 that fits on the recessed surface 126 of the corresponding port 124 to seal the adapter 180 relative to the base 120. The removable nature of the base 120 relative to the housing 111 combined with the flat platform at the top of the base 120 and the removable configuration of the manager 140 facilitates accessing the nuts 308 during installation of the adapters 180 on the base 120.

Figure 6:
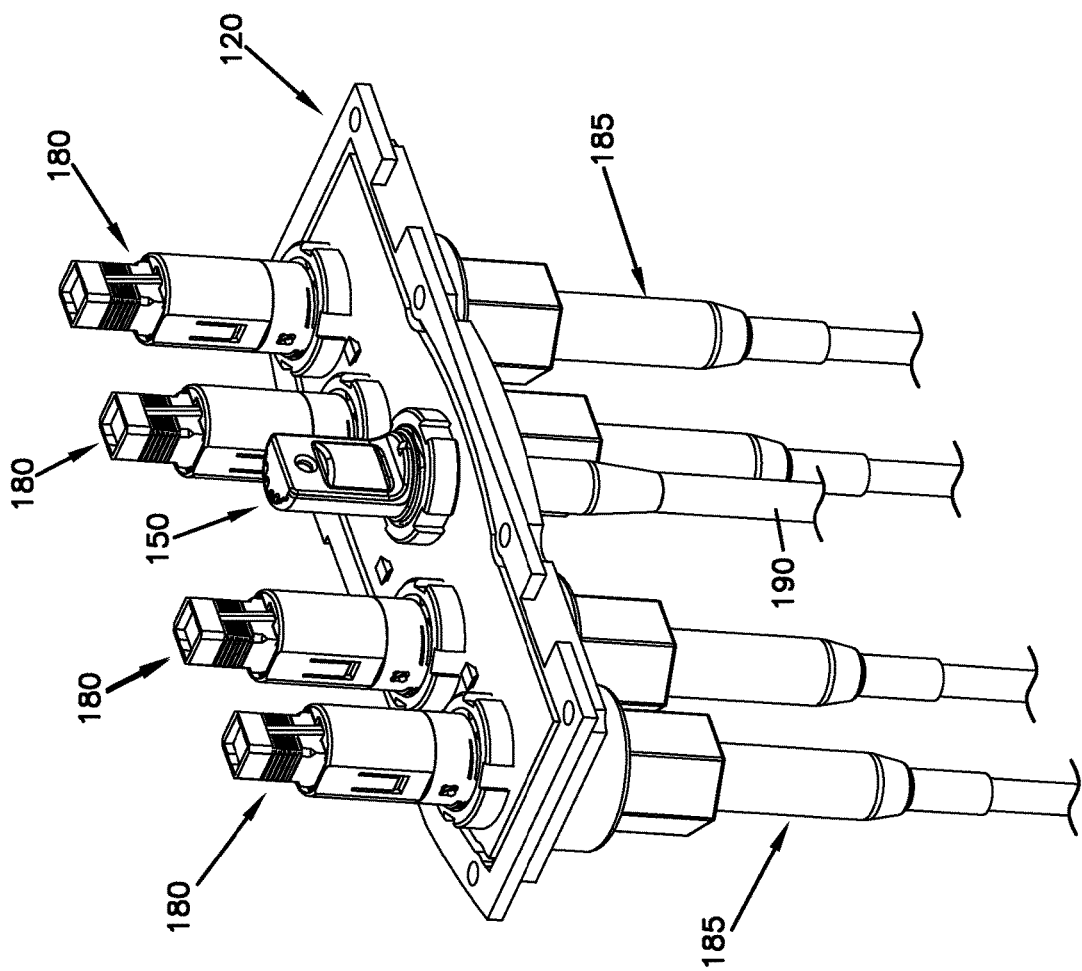
FIG. 6 is a top perspective view of the base loaded with ruggedized adapters and a ruggedized pass-through assembly in accordance with the principles of the present disclosure.
Figure 7:
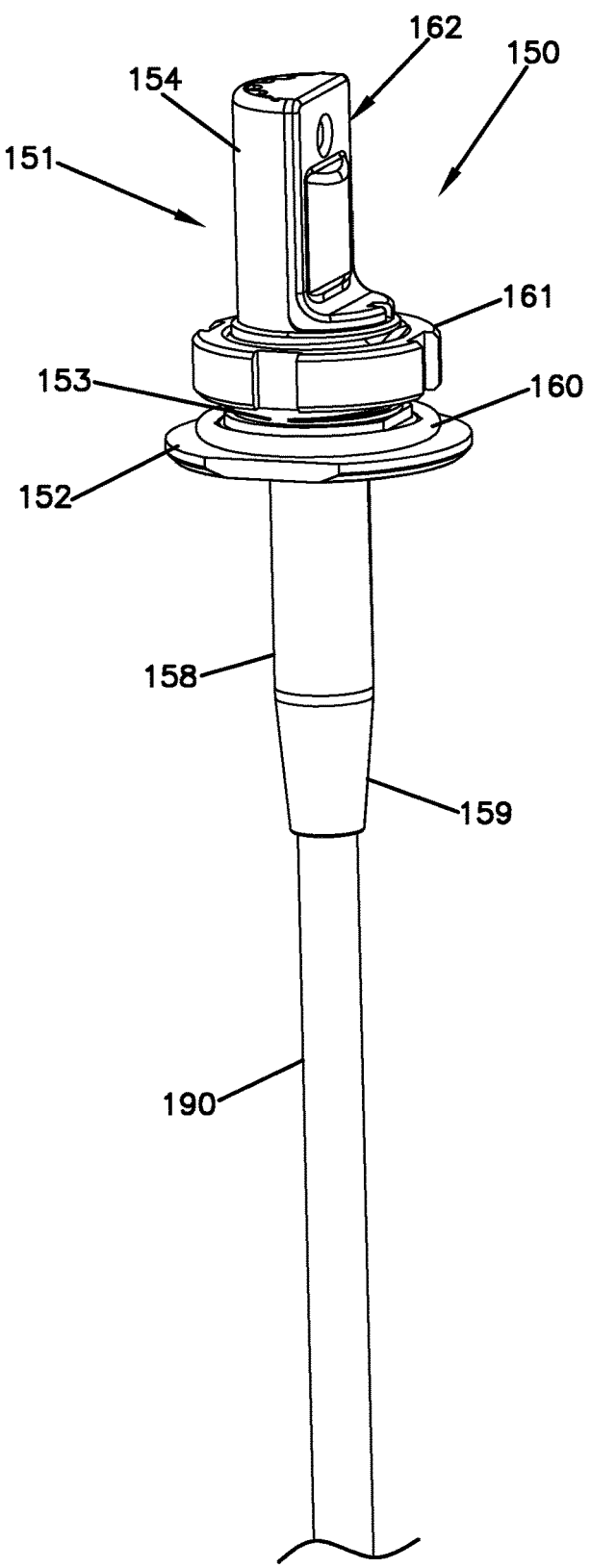
FIG. 7 is a perspective view of an example ruggedized pass-through assembly configured in accordance with the principles of the present disclosure.

FIGS. 6-7 illustrate one example ruggedized pass-through assembly 150 configured to secure the input cable 190 to the base 120. As shown in FIG. 7, the ruggedized pass-through assembly 150 includes an anchor member 151 and a cover 162. The anchor member 151 includes a threaded section 153 extending outwardly from a retention flange 152. A fanout section 154 extends outwardly from the threaded section 153. The cover 162 mounts to the fanout section 154 to provide opening through which optical input fibers 195 are routed.

A gasket (e.g., an O-ring) 160 is disposed around the threaded section 153 of the anchor member 151 to attach the pass-through assembly 150 to the base 120. The anchor member 151 is inserted through the input port 123 from the bottom of the base 120 so that the gasket 160 seats in the recessed surface 126 and the retention flange 152 abuts the bottom surface of the base body 121. The threaded section 153 of the anchor member 151 extends through the input port 123. A nut 161 is threaded onto the threaded section 153 to clamp the base body 121 between the nut 161 and the retention flange 152. The gasket 160 inhibits water, dirt, or other contaminants from entering the enclosure 110 through the input port 123. The removable nature of the base 120 relative to the housing 111 combined with the flat platform at the top of the base 120 and the removable configuration of the manager 140 facilitates accessing the nuts 161 during installation of the adapters 180 on the base 120.

Figure 8:
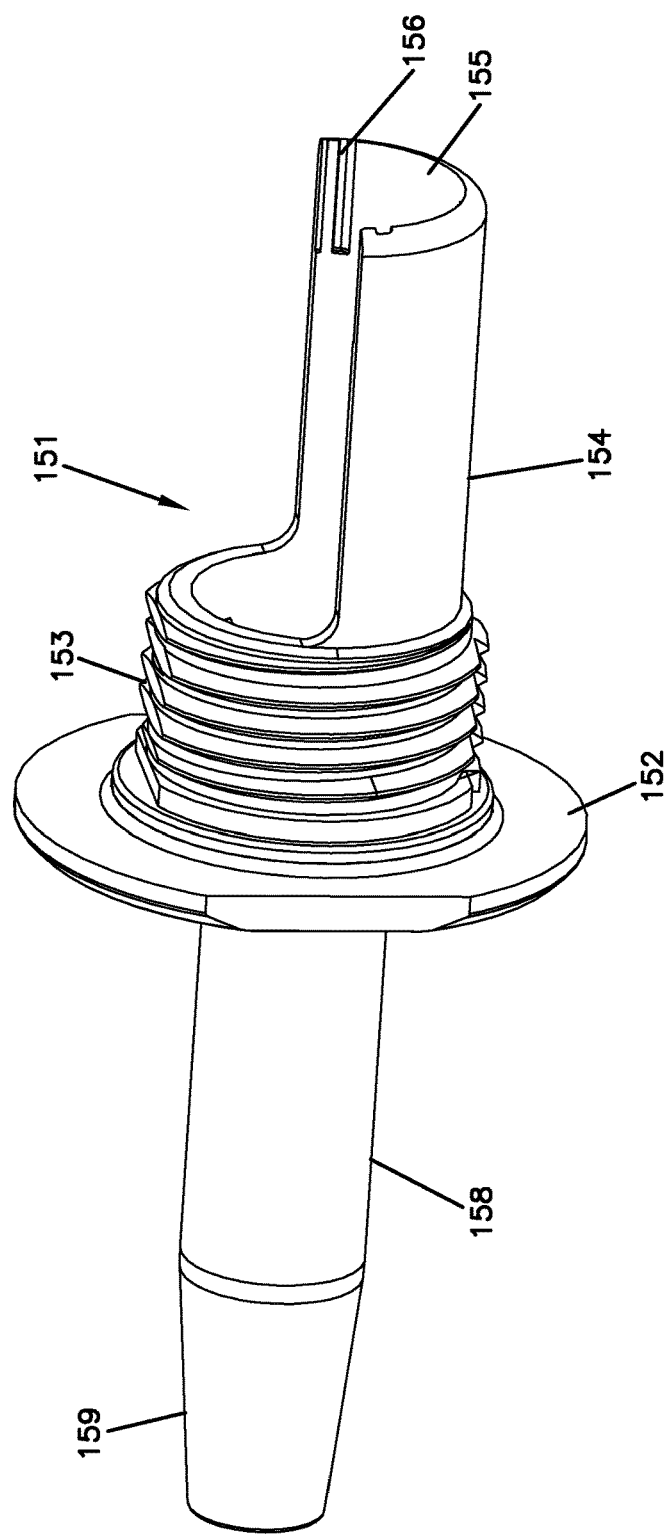
FIG. 8 is a perspective view of an anchor member of the ruggedized pass-through assembly of FIG. 7.
Figure 9:
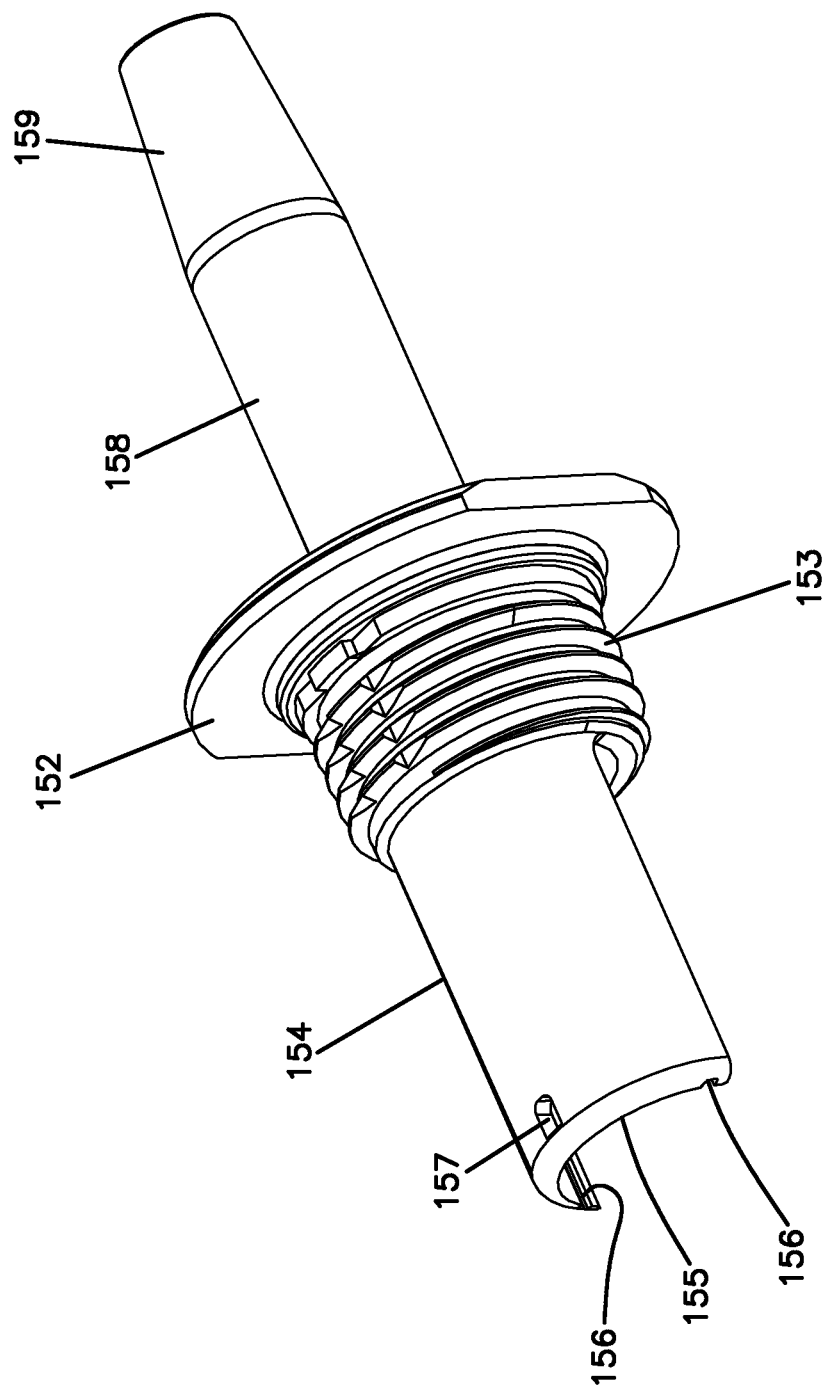
FIG. 9 is another perspective view of the anchor member of FIG. 8.

FIGS. 8-9 illustrate an example anchor member 151 suitable for use with the ruggedized pass-through assembly 150. The anchor member 151 extends longitudinally from a first end to a second end. The anchor member 151 includes a sleeve 158 extend outwardly from the retention flange 152 away from the threaded section 153. A distal end 159 of the sleeve 158 defines the first end of the anchor member 151. The distal end 159 tapers radially inwardly as the sleeve 158 extends away from the flange 152. The fanout section 154 defines the second end of the anchor member 151. The anchor member 151 defines a longitudinal passage extending from first end to the second end.

In some implementations, the fanout section 154 defines an open top leading to an interior channel 155 that defines part of the longitudinal passage through the anchor member 151. In the example shown, the fanout section 154 has a semi-circular transverse cross-section. The fanout section 154 includes mounting structure that is configured to mate with mounting structure on the cover 162 as will be described herein. In the example shown, the mounting structure includes slots 156 defined along the channel 155 and an opening 157 extending through the fanout section 154.

Figure 10:
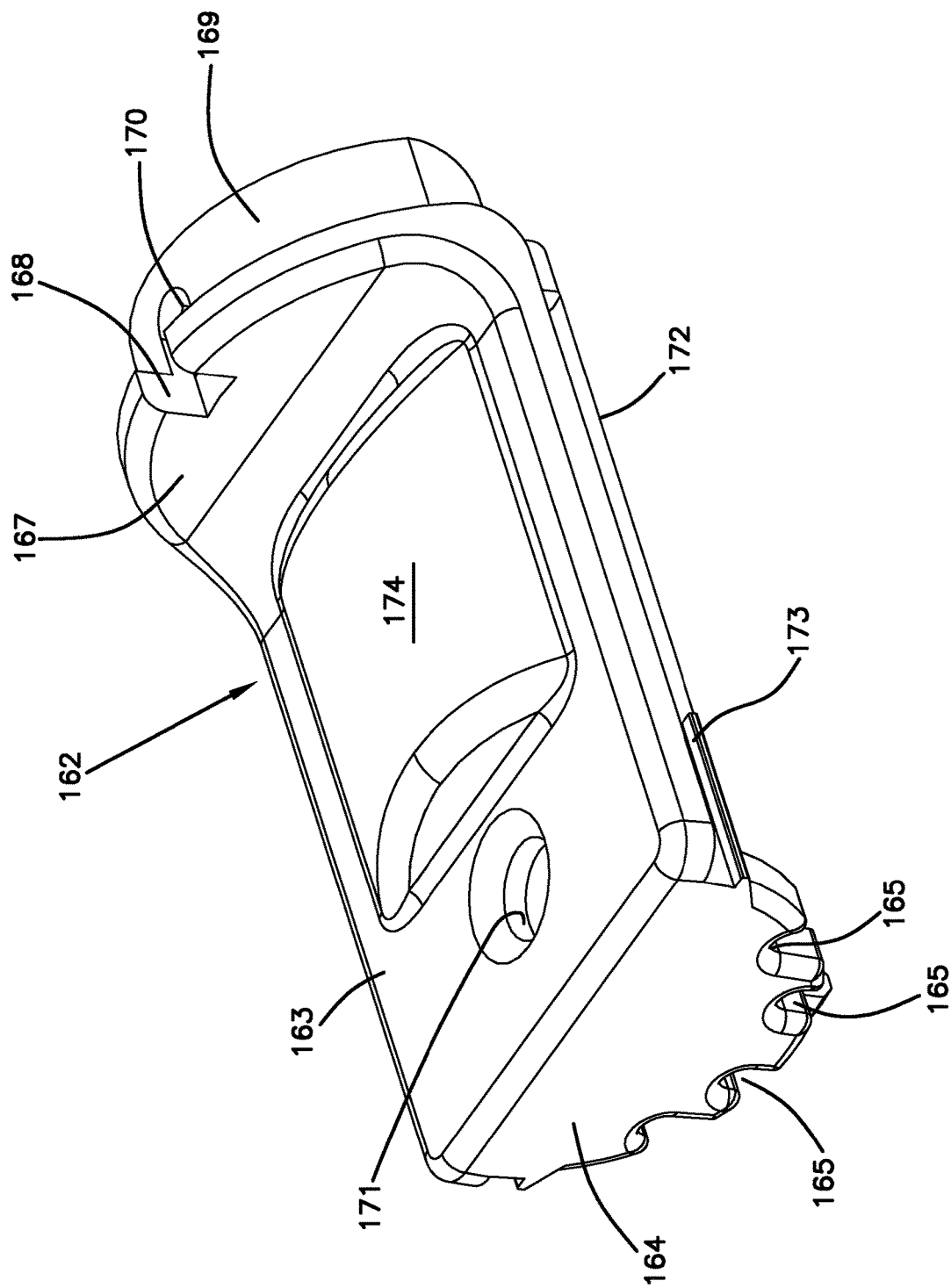
FIG. 10 is a perspective view of a cover member suitable for mounting to the anchor member of FIG. 8.
Figure 11:
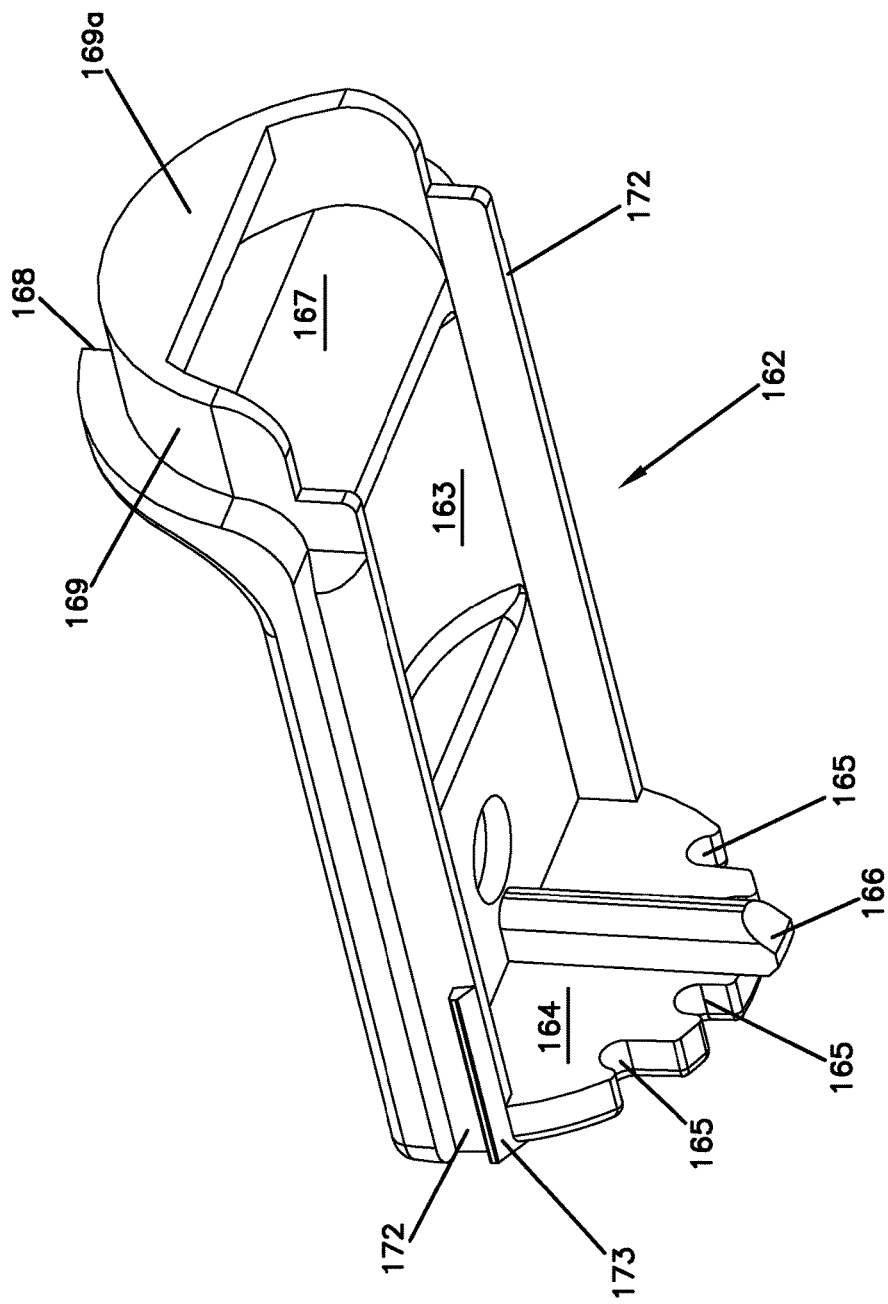
FIG. 11 is another perspective view of the cover member of FIG. 10.

FIGS. 10-11 illustrate an example cover 162 suitable for use with the ruggedized pass-through assembly 150. The cover 162 includes a body 163 that is configured to extend over the open top of the fanout section 154. The cover 162 also includes a separator 164 coupled to the cover body 163. The separator 164 is shaped to fit in the channel 155 at the second end of the anchor member 151. The separator 164 defines notches 165 that cooperate with the fanout section 154 of the anchor member 151 to define the openings through which the optical input fibers 195 can be routed (e.g., see FIG. 14) from the longitudinal passage.

The cover 162 includes a rear flange 169 configured to extend within an interior of the threaded section 153 when the cover 162 is mounted to the anchor member 151. The rear flange 169 has a rear surface 169a. The cover 162 also includes bottom flanges 172 that are configured to extend into the interior of the fanout section 154 when the cover 162 is mounted to the anchor member 151. The cover 162 also includes mounting structure that is configured to mate with the mounting structure of the fanout section 154. In the example shown, the mounting structure of the cover 162 includes snap-flanges 173 extending outwardly from the bottom flanges 172 and a post 166 extending downwardly from the separator 164. The snap-flanges 173 are configured to mate with the slots 156 defined in the channel 155 of the fanout section 154. The post 166 is configured to extend into the opening 157 defined in the fanout section 154.

The cover 162 also includes a contoured section 167 that extends from the cover body 163 to the outer edge of the threaded section 153 of the anchor member 151. Accordingly, mounting the cover 162 to the fanout section 154 encloses the channel 155 to form a potting region within the pass-through assembly 150. The rear flange 159 extends outwardly from the contoured section 167 (FIG. 11). A through opening 171 defined in the cover body 163 leads to the potting region. The contoured section 167 also defines a notch 168 that laterally aligns with a through opening 170 defined through the rear flange 159. When the cover 162 is mounted to the anchor member 151, the notch 168 and through opening 170 provide an egress for air to enable injection of adhesive into the potting region via the through opening 171.

Figure 12:
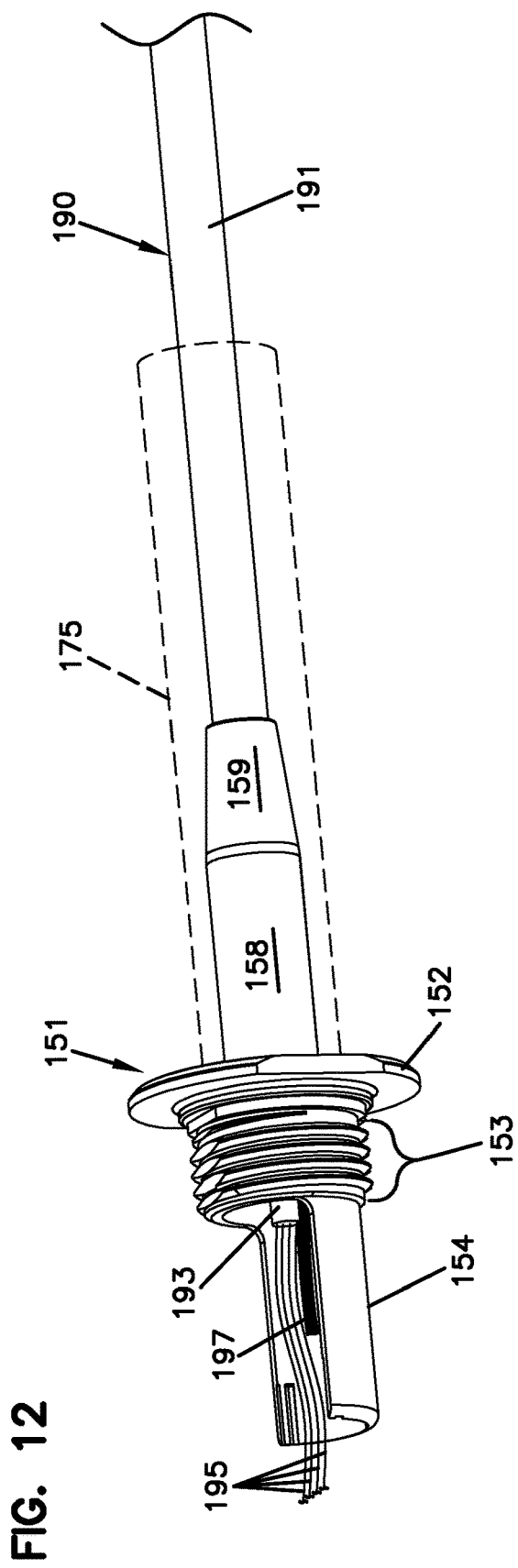
FIG. 12 is a perspective view of an input cable routed through an anchor member in accordance with the principles of the present disclosure.
Figure 13:
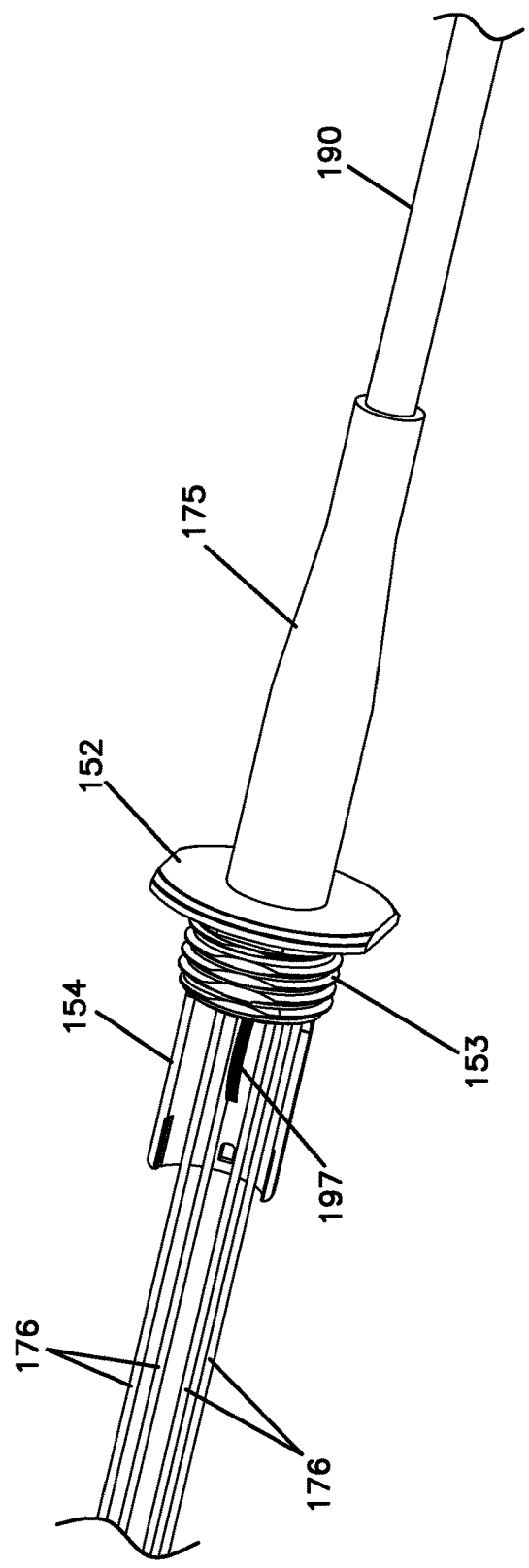
FIG. 13 shows a sheath shrunk onto the anchor member and input cable of FIG. 12 and overtubing threaded over the optical fibers in accordance with the principles of the present disclosure.
Figure 14:
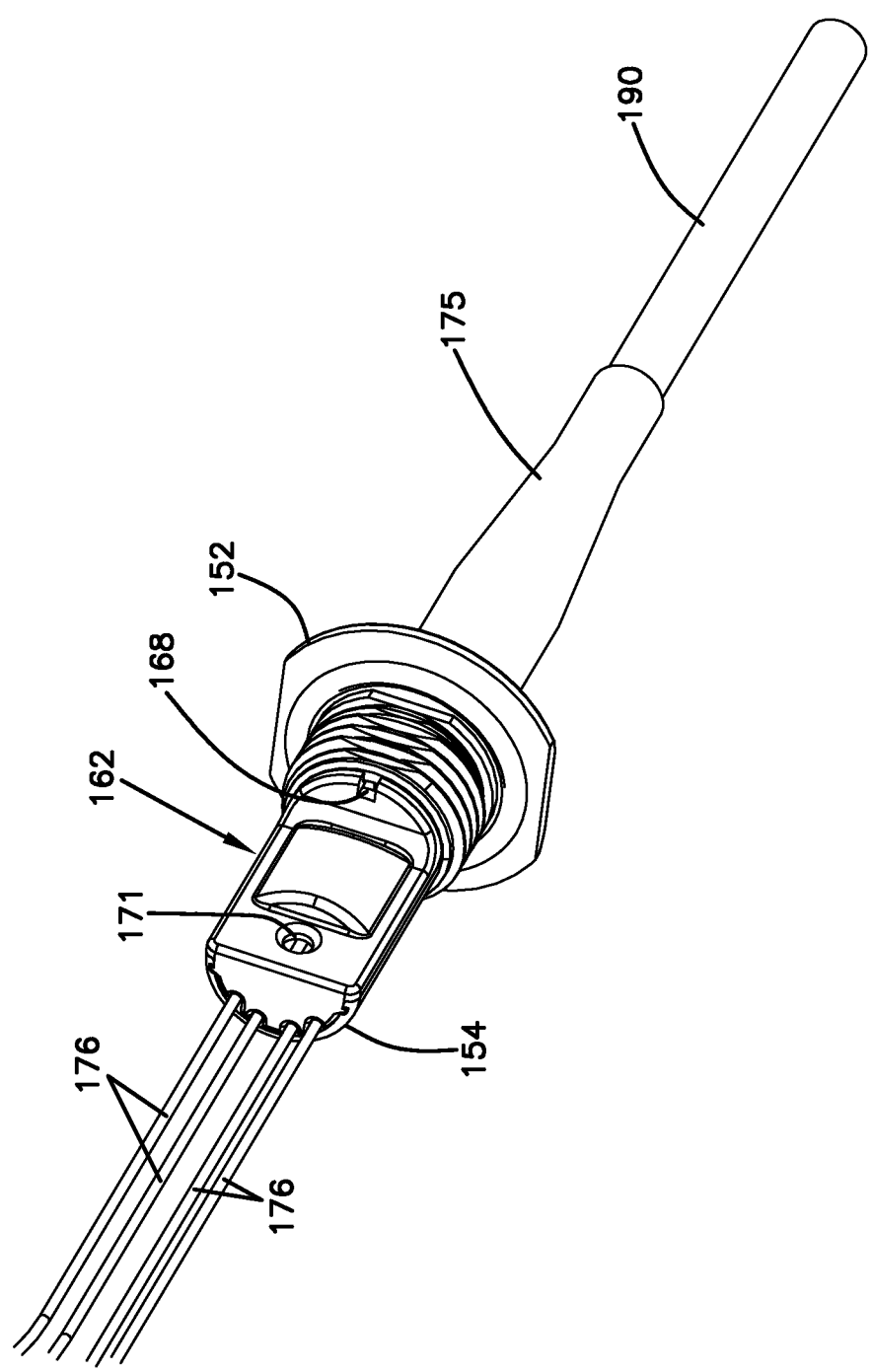
FIG. 14 shows a cover mounted to the anchor member of FIG. 13 in accordance with the principles of the present disclosure.

In use, the input cable 190 is secured to the pass-through assembly 150, which is secured to the base 120. FIGS. 12-14 illustrate the steps in securing the input cable 190 to the pass-through assembly 150. In the example shown, the input cable 190 includes multiple fibers 195 surrounded by a buffer tube 193 and strength members (e.g., aramid yarns) 197, which are surrounded by a jacket 191. In other implementations, the input cable 190 can include a single optical fiber 195. In still other implementations, the strength members 197 can be embedded within the jacket 191. The input cable 190 is prepared by removing a portion of the jacket 191 from the end of the cable 190. The end of the prepared cable is inserted through a sheath 175 (FIG. 12).

As shown in FIG. 12, the input cable 190 is routed into the anchor member 151 via the sleeve 158 so that a portion of the cable jacket 191 extends at least partially into the sleeve 158. The strength members 197 and buffer tube 193 extends past the jacket 191 through the threaded section 153. At least the strength members 197 extend into the channel 155 defined by the fanout section 154. The optical fibers 195 extend past the fanout section 154.

The sheath 175 is positioned so that a portion of the sheath 175 extends over the sleeve 158 and a portion of the sheath 175 extends over the cable jacket 191. In certain implementations, the sheath 175 is positioned to abut the retention flange 152. The sheath 175 can have a shape memory construction. In some implementations, the sheath 175 shrinks when exposed to heat. For example, heat can be applied (e.g., using a heat gun) to the sheath 175 to shrink the sheath 175 onto the sleeve 158 and jacket 191 to secure the jacket 191 to the anchor member 151 (see FIG. 13). In an example, the sheath 175 can include an interior adhesive layer. In other implementations, the sheath 175 can be cold-shrunk to the sleeve 158 and jacket 191. For example, a supporting removable core can be removed from an elastic sheath 175 to release the sheath 175 to return to an original shape.

FIG. 13 also shows the optical fibers 195 inserted into overtubing 176. The overtubing 176 protect the optical fibers 195 as the fibers 195 are routed through the enclosure 110. In some implementations, each optical fiber 195 has a diameter of about 250 μm and each overtubing 176 has a diameter of about 900 μm. In other implementations, the fibers 195 and overtubing can be any desired size.

As shown in FIG. 14, the cover 162 is mounted to the fanout section 154 of the anchor member 151 to enclose the strength members 197 of the input cable 190 within the potting region. For example, the rear flange 169 is inserted within the threaded region 153 and the bottom flange 172 is pushed into the fanout section channel 155. The overtubing 176 are routed out of the potting region through the openings defined by the notches 165 of the separator 164.

Figure 15:
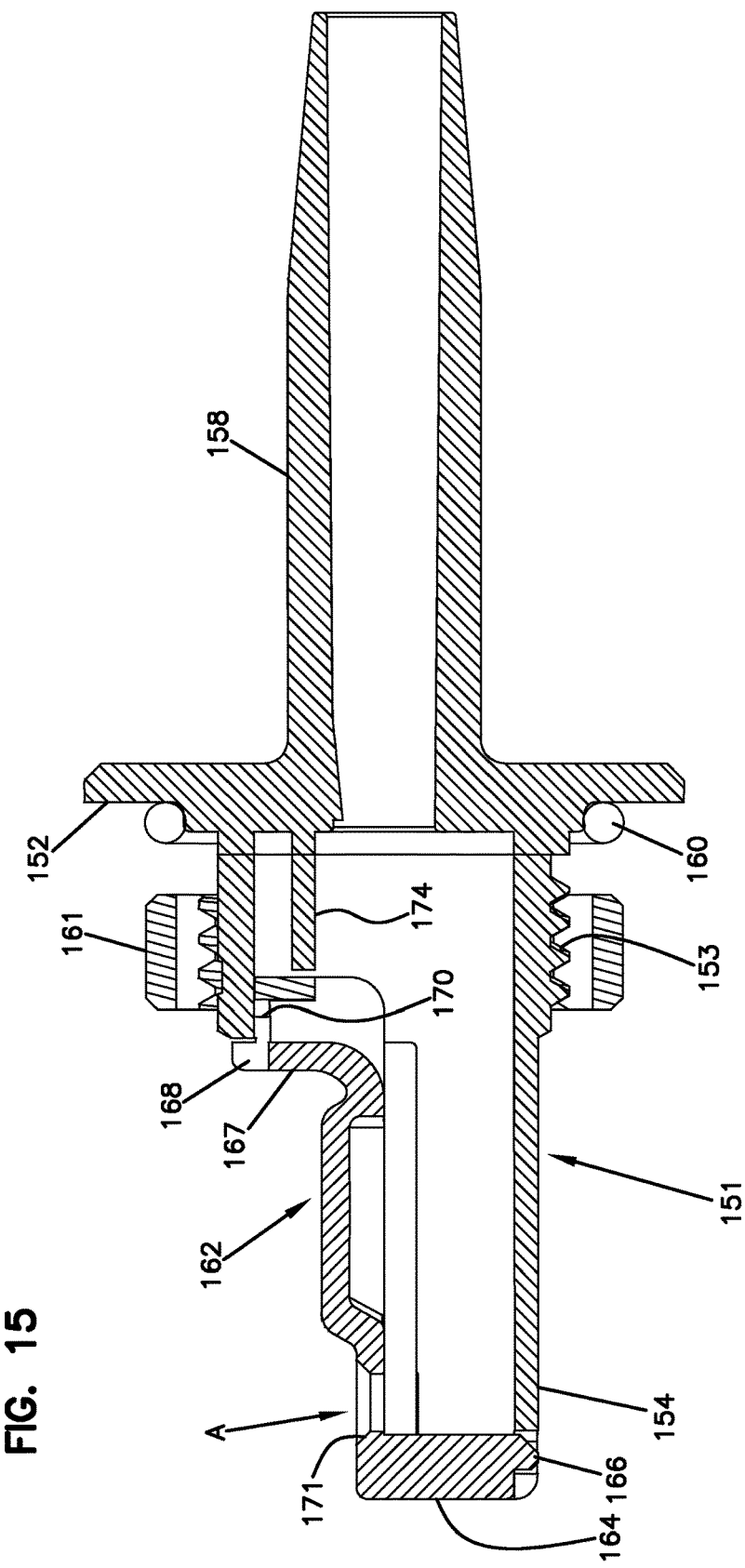
FIG. 15 is a cross-sectional view taken along a longitudinal axis of the pass-through assembly of FIG. 14 with the cable removed for ease in viewing.

As shown in FIG. 15, adhesive (e.g., potting compound, resin, etc.) can be applied to the potting region via the through-opening 171 (see arrow A). For example, the adhesive can be applied using a syringe. During the injection, air escapes from the potting region via a path defined by the opening 170 and notch 168 in the cover 162. The adhesive coats the strength members 197 to adhere the strength members 197 to the pass-through assembly 150. In certain implementations, the strength members 197 and overtubing 176 are fully potted within the potting region. In other implementations, sufficient adhesive is injected to affix the strength members 197 to the fanout section 154 and/or cover 162 without filling the potting region.

In the example shown in FIG. 15, the anchor member 151 includes a flange 174 that extends outwardly from the retention flange 152 and into an interior of the threaded section 153. The flange 174 is positioned and dimensioned to approach or abut the rear surface 169a of the cover rear flange 169. Accordingly, the flange 174 and cover rear surface 169a cooperate to reduce an interior volume of the potting region within the pass-through assembly 150.

FIGS. 17-24 illustrate another example base 220 and another example ruggedized pass-through assembly 250 suitable for use with the fiber distribution terminal 100 or similar fiber distribution terminal. In some implementations, the base 220 includes a low-rise wall 246 that surrounds the pass-through assembly 250. In certain implementations, the wall 246 also surrounds the output ports 224 defined in the base body 221. In examples, the wall 246 is sufficiently low-rise to not inhibit access to the ports 224 or adapters 180 mounted at the ports 224. In certain examples, the wall 246 defines a channel 222 in which a gasket 245 seats. The gasket 245 seals against the housing 111 (or other housing). In certain examples, one or more latches 228 extend outwardly from the wall 246 and/or from the base 220 to latch to the housing 111 (or other housing) to secure the housing 111 to the base 220.

In accordance with some aspects, the cables 190, 185 are coupled to the base 220 using ruggedized adapters 180 and/or ruggedized pass-through assemblies 250. For example, ruggedized adapters 180 can be mounted at the output ports 224 of the base 220. As noted above, the ruggedized adapters 180 can include both outer ports 300 that receive ruggedized connectors 302 terminating cables 185 and inner ports 304 that receive the connectorized ends 187, 189 of the pigtails 186, 188. The ruggedized adapters 180 can include alignment sleeves 306 for aligning the ferrules of the connectors desired to be optically coupled together. Each adapter 180 can include a nut 308 that threads on the main body of the adapter 180 to secure the adapter 180 at a given port 224. Each adapter 180 includes a seal 310 that fits about the corresponding port 224 to seal the adapter 180 relative to the base 220. The removable nature of the base 220 relative to the housing 111 combined with the relatively flat or low-rise platform at the top of the base 220 and the removable configuration of the manager 240 facilitates accessing the nuts 308 during installation of the adapters 180 on the base 220.

In accordance with some aspects of the disclosure, a portion of the ruggedized pass-through assembly 250 is monolithically formed with a portion of the base 220. For example, an anchor member 251 of the pass-through assembly 250 can be monolithically formed with a body 221 of the base 220. A fanout section 252 of the anchor member 251 extends from a first side of the base 220 (see FIG. 18) and a sleeve 253 of the anchor member 251 extends from a second side of the base 220 (see FIG. 17).

Figure 22:
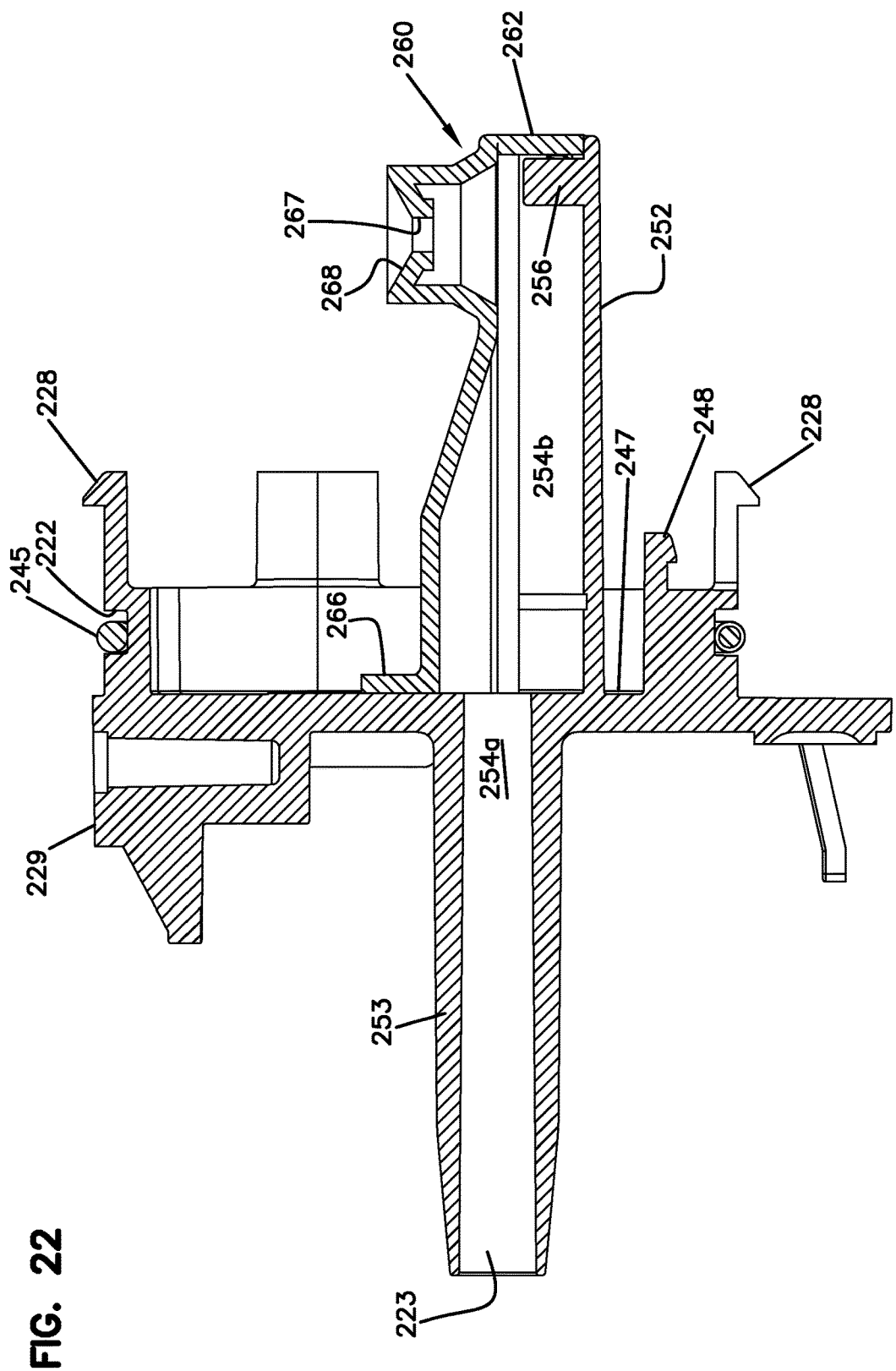
FIG. 22 is a longitudinal cross-sectional view of the base, anchor member, and cover of FIG. 21.
Figure 23:
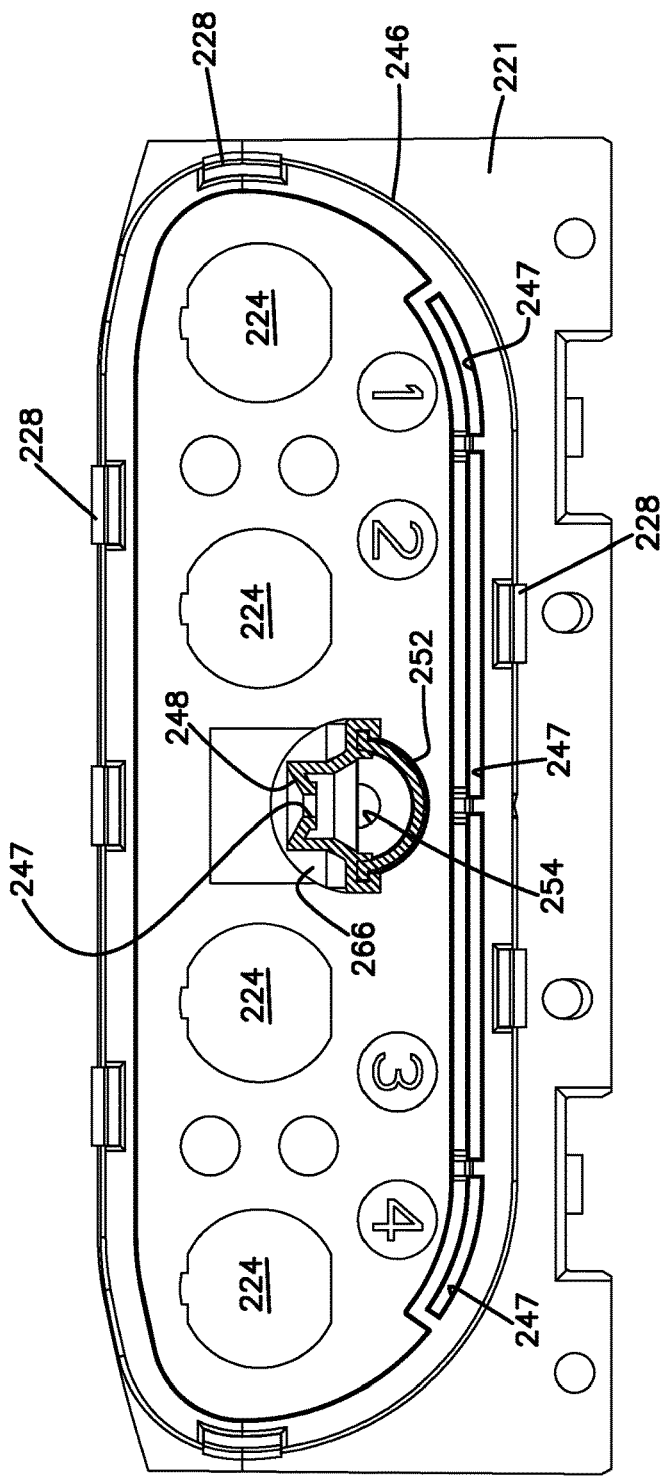
FIG. 23 is a top plan view of the base of FIG. 21 with distal end of the anchor member and cover reviewed for ease in viewing.
Figure 24:
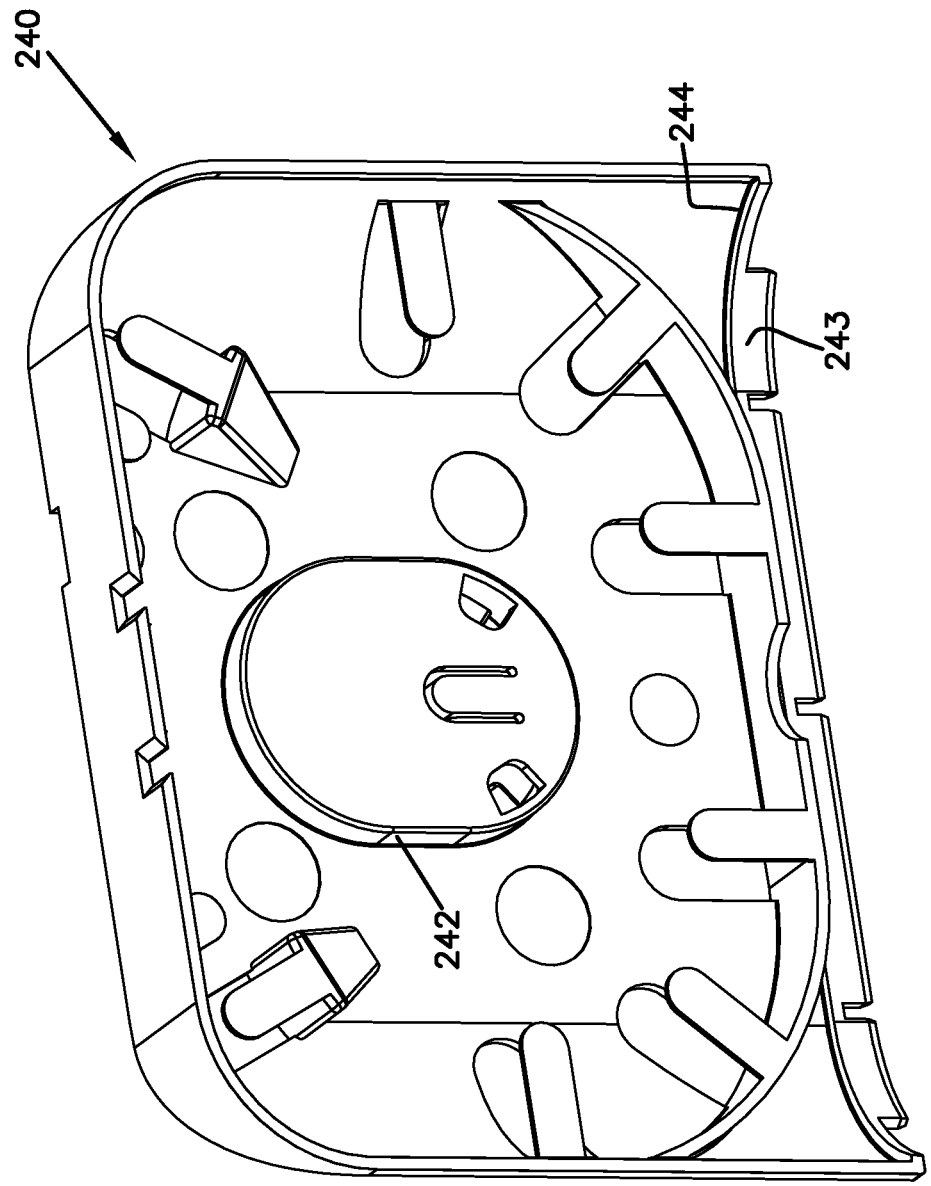
FIG. 24 is a perspective view of an example management frame suitable for use with the base of FIG. 18.

The anchor member 251 defines a passage 254 that extends through the anchor member 251 and through the base 220. A distal end of the sleeve 253 defines a cable input port 223 that leads to the passage 254. As shown in FIG. 22, the sleeve 253 defines a first section 254a of the passage 254 and the fanout section 252 defines a second section 254b of the passage 254. A cover 260 can be mounted to the fanout section 252 to further define the second section 254b of the passage 254 (e.g., see FIG. 22). Epoxy or other potting material can be disposed between the anchor member (251) and the base (260) to seal the cable (190) to the base (220).

In the example shown, the cover 260 includes guides 264 that define guide passageways 265 and the fanout section 252 of the anchor member 251 includes rails 255 that are configured to slide through the guide passageways 265 when the cover 260 is mounted to the fanout section 252. In examples, the cover 260 includes a rear flange 266 that abuts against the first side of the base 220. In other examples, the cover 260 can be otherwise mounted to the fanout section 252.

The fanout section 252 includes one or more separators 256 extending into the passage 254. The separator(s) 256 divides a portion of the passage 254 into two or more channels 257 at a distal end of the fanout section 252. In examples, distal ends of the separator(s) 256 define cam surfaces 258. In the example shown, four separators 256 extend into the passage 254 to define four channels 257 (e.g., see FIG. 19). In other examples, however, a greater or lesser number of separators 256 can extend into the passage 254 and form a greater or lesser number of channels 257. In the example shown, the separator(s) 256 are disposed at a position recessed axially inwardly from the distal end of the fanout section 252. One or more notches 259 are cut into the distal end of the fanout section 252. The notches 259 axially align with two of the channels 257 defined by the separators 256. In the example shown, the fanout section 252 defines two notches 259 that align with the outer two channels 257 defined by the separators 256.

The cover 260 includes a body 261 that extends axially over the fanout section 252 of the anchor member 251. The guides 264 are disposed at opposite sides of the body 261 that receive the rails 255 of the fanout section 252 of the anchor member 251. The body 261 includes a front flange 262 that extends across the passage 254 when the cover 260 is mounted to the fanout section 252. In the example shown, the front flange 262 is disposed between the separators 256 and the distal end of the anchor section 252. The front flange 262 defines one or more notches 263 that axially align with one or more of the channels 257 defined by the separators 256. In the example shown, the front flange 262 defines two notches 263 that align with the inner two channels 257 defined by the separators 256. Accordingly, the aligned channels 257 and notches 263 form passages out of the pass-through assembly 250.

In some implementations, the cover 260 includes an injection port 267 that leads between the passage 254 and an exterior of the pass-through assembly 250. Epoxy or other material can be injected or otherwise inserted into at least the second section 254b of the passage 254 via the injection port 267. In certain examples, the epoxy or other material also can be inserted into the first section 254a of the passage 254 via the injection port 267. In certain examples, a funnel 268 leads to the injection port 267.

In use, the input cable 190 is secured to the pass-through assembly 250. The input cable 190 is prepared by removing a portion of the jacket 191 from the end of the cable 190. The end of the prepared cable is inserted through a sheath 175 (FIG. 12) and into the cable port 223 of the sleeve 253 of the anchor member 251. The strength members 197 and optical fibers 195 extend through the sleeve 253 past the jacket 191 and into the anchor section 252 of the pass-through assembly 250.

The strength members 197 extend into one or more of the channels 257 defined by the separators 256 at the fanout section 252. For example, the strength members 197 can be routed through the outermost channels 257 and through the notches 259. In an example, the strength members 197 are clamped between the fanout section 252 and the cover 260. In an example, the strength members 197 protrude outwardly from the pass-through assembly 250. The optical fibers 195 extend past the fanout section 252. For example, the optical fibers 195 can be routed through the inner channels 257 and through the notches 263 in the cover 260 to extend out of the pass-through assembly 250. In examples, the optical fibers 195 can be upjacketed using overtubing 176.

Adhesive (e.g., potting compound, resin, etc.) can be injected or otherwise inserted into the passage 254 of the pass-through assembly 250 via the injection port 267. For example, the adhesive can be applied using a syringe. The adhesive coats the strength members 197 to adhere the strength members 197 to the pass-through assembly 150. In certain implementations, the strength members 197 and overtubing 176 are fully potted within the fanout section 252. In other implementations, sufficient adhesive is injected to affix the strength members 197 to the fanout section 252 and/or cover 260 without filling the fanout section. In certain examples, sufficient adhesive to fill at least a portion of the sleeve 253 in addition to at least a portion of the fanout section 252 is injected through the port 267.

The sheath 175 is used to secure the cable jacket 191 to the anchor member 251. The sheath 175 is positioned so that a portion of the sheath 175 extends over the sleeve 253 and a portion of the sheath 175 extends over the cable jacket 191. The sheath 175 can have a shape memory construction. In some implementations, the sheath 175 shrinks when exposed to heat. For example, heat can be applied (e.g., using a heat gun) to the sheath 175 to shrink the sheath 175 onto the sleeve 253 and the jacket 191 to secure the jacket 191 to the anchor member 251. In an example, the sheath 175 can include an interior adhesive layer. In other implementations, the sheath 175 can be cold-shrunk to the sleeve 253 and the jacket 191. For example, a supporting removable core can be removed from an elastic sheath 175 to release the sheath 175 to return to an original shape.

The optical fibers 195 can be routed from the pass-through assembly 250 to an example management frame 240 (FIG. 24) that couples to the base 220. For examples, input optical fibers 195 can extend away from the pass-through assembly 250 within the enclosure 110 and be spliced to pigtails 188 having connectorized ends 189 that are plugged into optical adapters 180 at the output ports 224 of the base 220. The splicing can take place at a splice tray or splice module (e.g., splice module 141 of FIG. 4) supported on the manager 240.

In certain examples, the wall 246 defines one or more recesses (e.g., channels, wells, etc.) 247 sized to receive insertion flanges 243 of the management frame 240. In certain examples, the management frame 240 defines a ledge 244 that faces away from the recesses 247. In the example shown, the wall 246 includes one or more latching fingers 2548 that are configured to snap over the ledge 244 when the management frame 240 is coupled to the wall 246. The optical fibers 195 can be routed from the pass-through assembly 250 to management structures (e.g., a cable spool 242) of the management frame 240.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES 100 fiber distribution terminal
105 splitter
108 labels
110 enclosure
111 housing
H height
W width
D primary depth
112 open end
113 mounting brackets
114 slots
120 base
121 body
122 channel
123 input cable port
124 output cable port
125 short wall
126 recessed surface
127 retaining structures
128 cutouts
129 retention flange
130 cover
131 front plate
132 side walls
133 flanges
134 pivot pins
135 open bottom
136 opening
140 management frame
141 splice module
150 pass-through assembly
151 anchor member
152 retention flange
153 threaded section
154 fanout section
155 channel
156 slots
157 opening
158 sleeve
159 distal end
160 gasket
161 nut
162 cover
163 body
164 separator
165 notches
166 post
167 contoured section
168 notch
169 rear flange
169a rear surface
170 through-opening
171 through-opening
172 bottom flanges
173 snap-flanges
174 flange
175 sheath
176 overtubing
180 ruggedized adapters
185 output cables
186 splitter pigtail
187 optical connector
188 pigtails
189 optical connector
190 input cable
191 jacket
193 buffer tube
195 input fiber
197 strength members
220 base
221 body
222 channel
223 input cable port
224 output cable port
227 retaining structures
228 latches
229 retention flange
240 management frame
242 spool
243 flanges
244 ledge
245 gasket
246 wall
247 recesses
248 latching fingers
250 pass-through assembly
251 anchor member
252 fanout section 253 sleeve
254 passage
255 rails/wings
256 separators
257 channels
258 cammed surfaces
259 notches
260 cover
261 body
262 front flange
263 notches
264 guides
265 guide passages
266 engagement flange
267 injection port
268 funnel
300 outer port
302 ruggedized connector
304 inner ports
306 alignment sleeves
308 nut
310 seal

What is claimed is:

1. A pass-through assembly comprising:
an anchor member defining a through-passage extending between an open first end and an open second end, the anchor member including a sleeve defining the first end and a fanout section defining the second end; and
a cover configured to mount to the fanout section of the anchor member to substantially cover the open second end of the anchor member, the cover cooperating with the fanout section to form a potting region within the anchor member, the cover defining an injection port providing injection access to the potting region when the cover is mounted to the fanout section,
the anchor member and the cover cooperating to define separate channels leading out of the through-passage through the second end of the anchor member.

2. The pass-through assembly of claim 1, further comprising a cable extending into the through-passage through the sleeve, the cable including a plurality of optical fibers, each of the optical fibers extending out of the through-passage through one of the channels.

3. The pass-through assembly of claim 2, wherein the anchor member and cover are configured to fully encapsulate strength members of the cable.

4. The pass-through assembly of claim 2, wherein the anchor member and cover are configured to enable strength members of the cable to leave the potting region of the pass-through assembly.

5. The pass-through assembly of claim 4, wherein the strength members extend through outermost ones of the channels and the optical fibers extend through innermost ones of the channels.

6. The pass-through assembly of claim 2, wherein strength members of the cable and overtubing disposed over the optical fibers of the cable are fully potted within the fanout section.

7. The pass-through assembly of claim 2, wherein sufficient adhesive is injected to affix strength members of the cable to the pass-through assembly without filling the fanout section.

8. The pass-through assembly of claim 1, further comprising a shape-memory sheath having a first portion disposed over the sleeve of the anchor member and a second portion disposed over a jacketed portion of the cable.

9. The pass-through assembly of claim 1, wherein the anchor member includes a separator extending into the through-passage to define the channels.

10. The pass-through assembly of claim 9, wherein the separator is one of a plurality of separators extending into the through-passage.

11. The pass-through assembly of claim 9, wherein the cover includes a front flange extending into the through-passage, the front flange defining a plurality of notches that align with one or more channels of the separator.

12. The pass-through assembly of claim 1, wherein the cover includes a separator extending into the through-passage to define the channels.

13. The pass-through assembly of claim 12, wherein the separator defines notches that cooperate with the fanout section of the anchor member to define the channels.

14. The pass-through assembly of claim 1, wherein the anchor member is integral with a base of a terminal.

15. The pass-through assembly of claim 1, wherein the anchor member includes a retention flange positioned intermediate between the first and second ends.

16. The pass-through assembly of claim 15, wherein the anchor member carries a seal disposed at the retention flange.

17. The pass-through assembly of claim 15, wherein the anchor member includes a threaded portion and a nut sized to mount over the threaded portion.

18. The pass-through assembly of claim 1, wherein the cover defines a vent hole leading to the potting region.

19. The pass-through assembly of claim 1, wherein the fanout section includes rails and wherein the cover includes guides defining guide passageways along which the rails slide when the cover is mounted to the anchor member.

20. The pass-through assembly of claim 1, wherein the optical fibers are upjacketed using overtubing.

* * * * *